Jan. 3, 1950     F. A. FISH     2,493,482
AQUATIC DEVICE
Filed Aug. 10, 1944     9 Sheets—Sheet 1

FRANKLIN A. FISH
*INVENTOR.*

BY Donald T. Hillier
Philip S. Hopkins
ATTORNEYS

FRANKLIN A. FISH
*INVENTOR.*

FRANKLIN A. FISH
INVENTOR.

BY
ATTORNEYS

FRANKLIN A. FISH
INVENTOR.

FRANKLIN A. FISH
INVENTOR.

Jan. 3, 1950      F. A. FISH      2,493,482
AQUATIC DEVICE

Filed Aug. 10, 1944      9 Sheets-Sheet 7

FRANKLIN A. FISH
*INVENTOR.*

BY *Donald T. Hiller*
*Philip S. Hopkins*
ATTORNEYS

Jan. 3, 1950   F. A. FISH   2,493,482
AQUATIC DEVICE
Filed Aug. 10, 1944   9 Sheets-Sheet 8

FRANKLIN A. FISH
*INVENTOR.*

BY
ATTORNEYS

Jan. 3, 1950     F. A. FISH     2,493,482
AQUATIC DEVICE

Filed Aug. 10, 1944     9 Sheets-Sheet 9

FRANKLIN A. FISH
*INVENTOR.*

BY
ATTORNEYS

Patented Jan. 3, 1950

2,493,482

UNITED STATES PATENT OFFICE 2,493,482

AQUATIC DEVICE

Franklin A. Fish, Gananoque, Ontario, Canada, assignor to Link Manufacturing Company, Ltd., Gananoque, Ontario, Canada, a corporation of Canada Application August 10, 1944, Serial No. 548,894

5 Claims. (Cl. 35—12)

This invention relates to an aquatic device useful in the training of students to control real aircraft in flight; alternatively it may be used as an amusement device.

As will be later described in detail the preferred embodiment of this invention comprises a fuselage having a seat for a student mounted upon a central streamlined vertical column. A pair of pontoons are provided, one on each side of the fuselage parallel thereto, and positioned slightly below the bottom of the fuselage. To the lower end of the vertical column is attached a streamlined chamber which in turn is affixed upon a larger streamlined chamber. A pair of wings much like the conventional airplane wings are provided, one of these wings being attached to each side of the smaller chamber and extending substantially perpendicularly to the longitudinal center lines of the fuselage and chambers. Each of these wings is attached to the upper rear part of the smaller chamber, and each wing has at its outer end an aileron.

Attached to the chambers and extending rearwardly are a pair of longerons which support an elevator, a rudder and a horizontal stabilizer.

Within the larger lower chamber is a gasoline engine which drives a propeller placed ahead of the smaller chamber, wings and ailerons. The axis of rotation of this propeller, if extended, would be slightly below the leading edges of the wings and ailerons. A throttle is provided within the fuselage for the operator to control the speed of the engine. Also within the larger chamber there are several hundred pounds of lead to give the apparatus a lower center of weight.

When this device is placed in the water the weight of the apparatus causes a part of the pontoons and all parts below the pontoons to be completely submerged. When the engine within the lower larger chamber is started and is running at idling speed, the coaction of the propeller and water causes the device to move forward very slowly. However, if the speed of the engine be increased sufficiently the apparatus achieves forward speed, and the forward speed may be increased to such an extent that the coaction of the wings and ailerons with the water may lift the pontoons and the upper part of the central vertical column out of the water. As a result, the fuselage is elevated relative to the surface of the water. The whole device may be elevated until the propeller or wings and ailerons approach the surface of the water.

As will be later more fully described, within the trainer fuselage is a control stick which simulates the control stick or control column in a real plane. When the device is moving through the water at a sufficiently rapid speed upon a movement, for example to the left of the control stick, the rear edge of the left aileron goes up and the rear edge of the right aileron goes down, thereby causing a banking to the left of the fuselage and other parts of the device just as a corresponding movement of the control stick in a real plane causes a banking to the left of the plane. A movement in the opposite direction of the control stick causes opposite movements of the ailerons an consequently a banking to the right of the apparatus results.

Also, if the control stick be pushed forward the rear edge of the elevator goes down and by virtue of the coaction of the elevator with the water in which it is submerged the apparatus dies in simulation of the diving of a real plane in actual flight in response to corresponding movements of the control stick and elevator. On the other hand, a rearward motion of the control stick causes the fuselage and other parts of the device to assume a climbing attitude.

Within the fuselage and placed ahead of a seat is a pair of rudder pedals. A pushing forward of the left rudder pedal by the student results in a movement of the rear edge of the rudder to the left and by coaction with the water the device turns to the left in simulation of the turning to the left of a real plane in actual flight in response to similar movements of the rudder pedals and rudder. A pushing ahead of the right rudder pedal, on the other hand, results in a turning to the right of the device.

It is a principal object of this invention to provide improved control means in a device such as that previously described.

A more specific object of my invention is to provide in such a device means whereby when the device is banked it will automatically turn in the direction of the bank and to an extent proportionate with the degree of the bank, and, further, means for eliminating the automatic turn with bank when the device is returned to level transverse "flight."

It is a further object of my invention to provide means whereby the above resultant turning of the device caused by a banking thereof may be decreased or overcome by an application of the rudder opposite the direction of the bank, and means whereby the degree of turn may be increased by the application of the rudder on the side of the device in the direction of the turn.

Another object of my invention is to provide time delay means for delaying the changes in the speed of the propeller and consequent speed of the device through the water in response to a change in throttle setting, whereby the gradual increase or decrease in the speed of a plane along the ground or through the air as a result of a change in the throttle setting may be closely simulated.

It is still another stated object of my invention to provide means for simulating in a device of the character disclosed herein means for simulating the "mush" and "stall" of a plane in actual flight.

Also, a further object of my invention is to provide means whereby a simulated air speed indicator in the device may be made to closely simulate the functioning of the air speed indicator in a real plane.

Another object of my invention is to provide the wings of the device with sharp leading edges, whereby the performance of the device is greatly improved.

Other related objects of the invention will become apparent as the description proceeds. Reference is now made to the accompanying figures which show a preferred embodiment of the invention.

In the figures,

Fig. 5A is a detailed view of the switching means of the turn with bank mechanism.

General description

Figure 1:
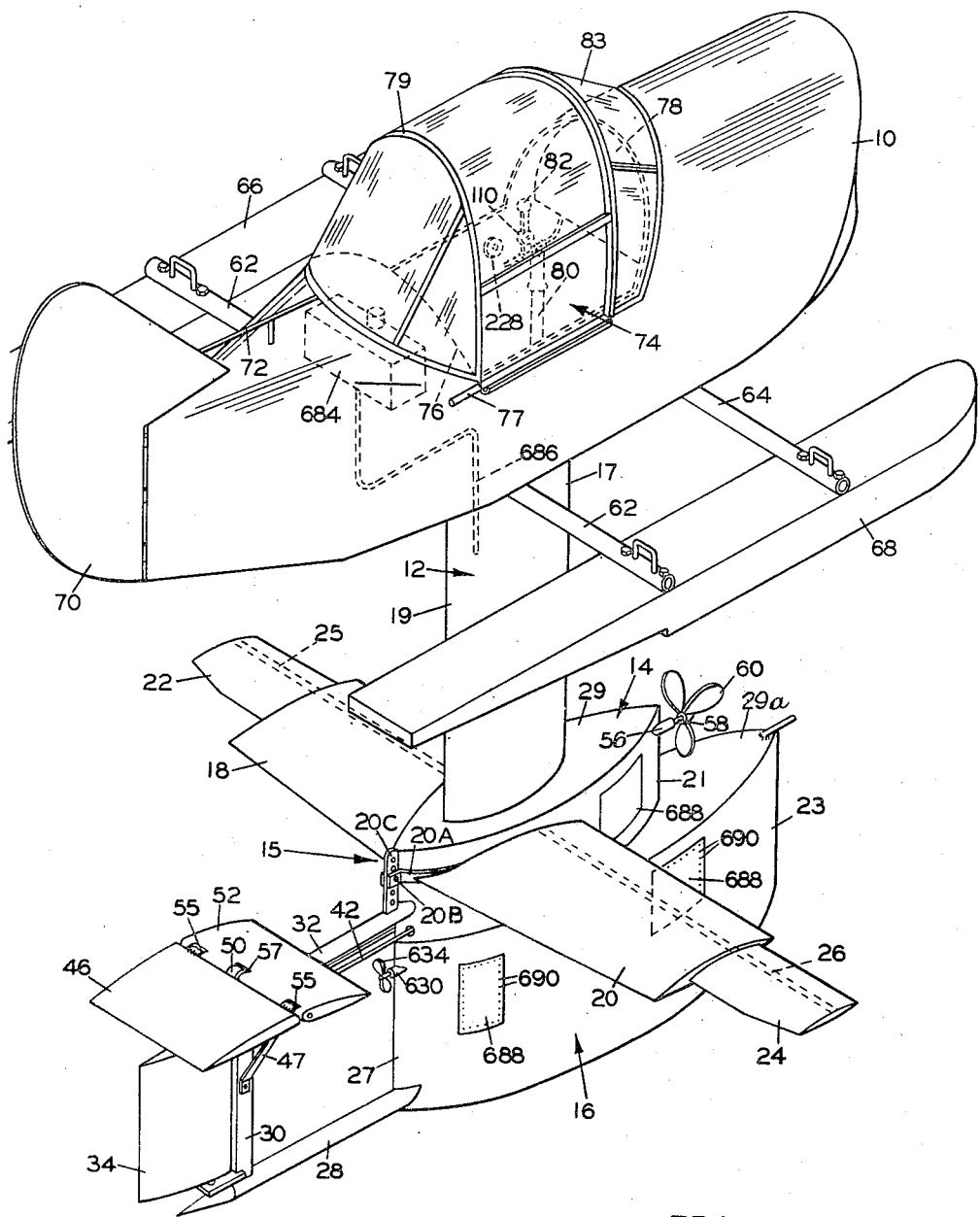
Fig. 1 is a general view of the exterior of the device showing many of the parts described above.
Figure 6:
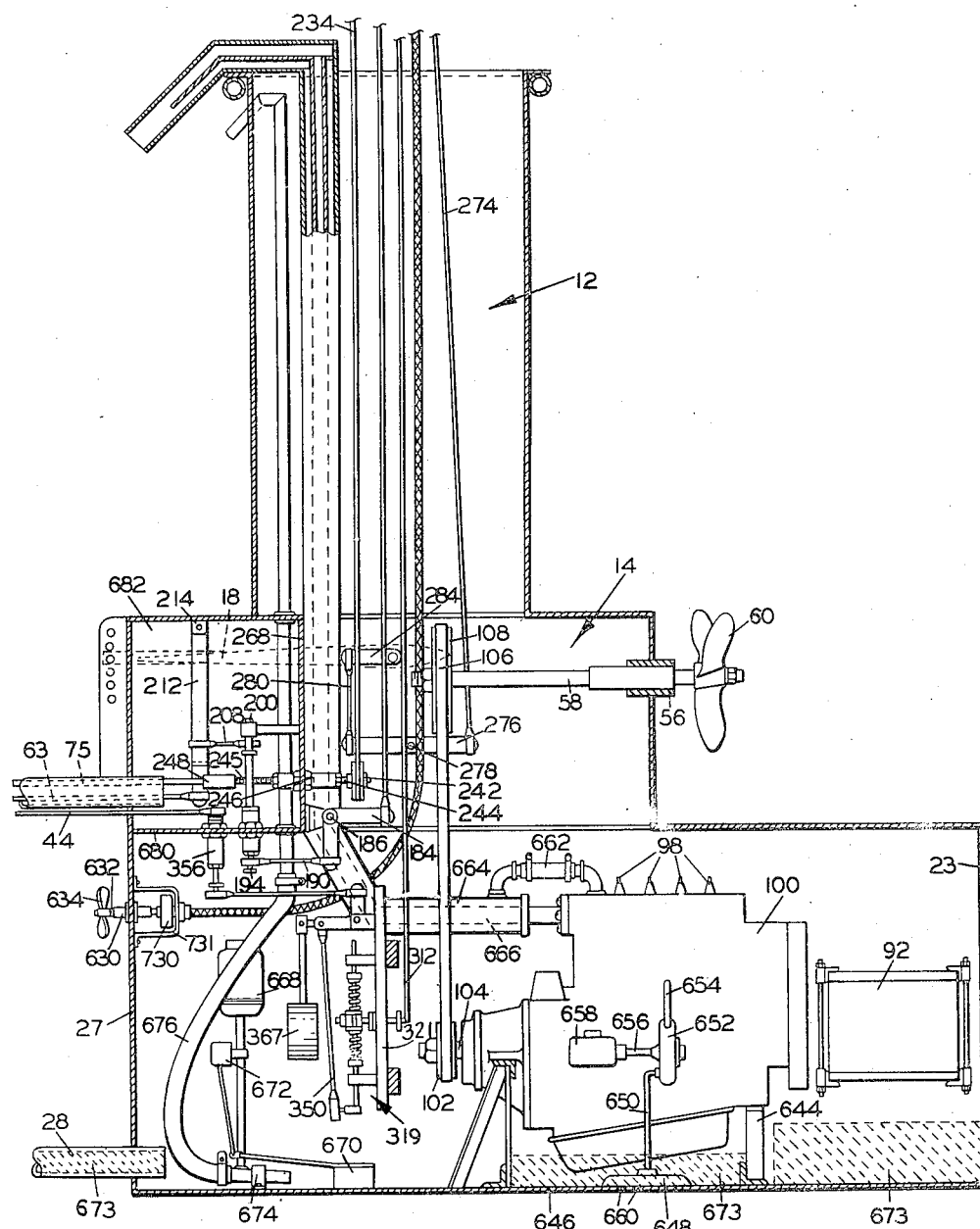
Fig. 6 is a longitudinal cross sectional view of a part of the device.

Reference is now made to Fig. 1 which discloses in general the fuselage 10 mounted rigidly upon the top of an all-metal welded, streamlined and watertight structure or nacelle, designated generally by 15. This nacelle 15 is composed of a central, hollow vertical column 12, an upper chamber 14 and a lower chamber 16, all suitably welded together forming one integral streamlined unit or structure, as seen in Fig. 1. Vertical column 12 has sharp vertical leading and trailing edges 17 and 19 while chambers 14 and 16 have sharp vertical leading edges 21 and 23 as well as a common sharp trailing edge 27. Further the bottom of chamber 16 is flat as are the upper surfaces 29 and 29a. The sharp leading edges are provided in order to reduce the resistance of the water to the device as it moves therethrough, and the flat bottom and tops increase the stability of the device. To the sides of the upper chamber 14 and attached toward the rear upper parts thereof are a pair of winglike members 18 and 20. The left wing is designated by 18 and is attached to the left side of chamber 14 while right wing 20 is attached to the right side of chamber 14. These wings preferably have an exterior shape as shown in Figs. 1 and 6, the leading edges of the wings being higher than the trailing edges to give a positive angle of attack when the device is in level "flight." It should be noted that the leading edges of the wings are not curved as is the case in conventional airplanes. Instead the wings have sharp leading edges, made necessary by the density of the medium through which they move. The bottom of each of the wings is substantially flat except for a slight upward curvature near the leading edge, and the upper surface of each of the wings is cambered. At the outer end of left wing 18 is left aileron 22 and at the right end of wing 20 is the right aileron 24. These ailerons are preferably shaped as seen in Fig. 1. Aileron 24 is rigidly affixed to transverse shaft 26 as will be later more fully described and aileron 22 is likewise affixed to a similar shaft 25.

A strap 20a is integral with each of the wings and a bolt 20b may be placed in a hole in the rear end of the strap and through any one of several holes in a vertical plate 20c affixed to the rear of chamber 14. The angle of incidence of the wings may thus be varied.

Figure 1A:
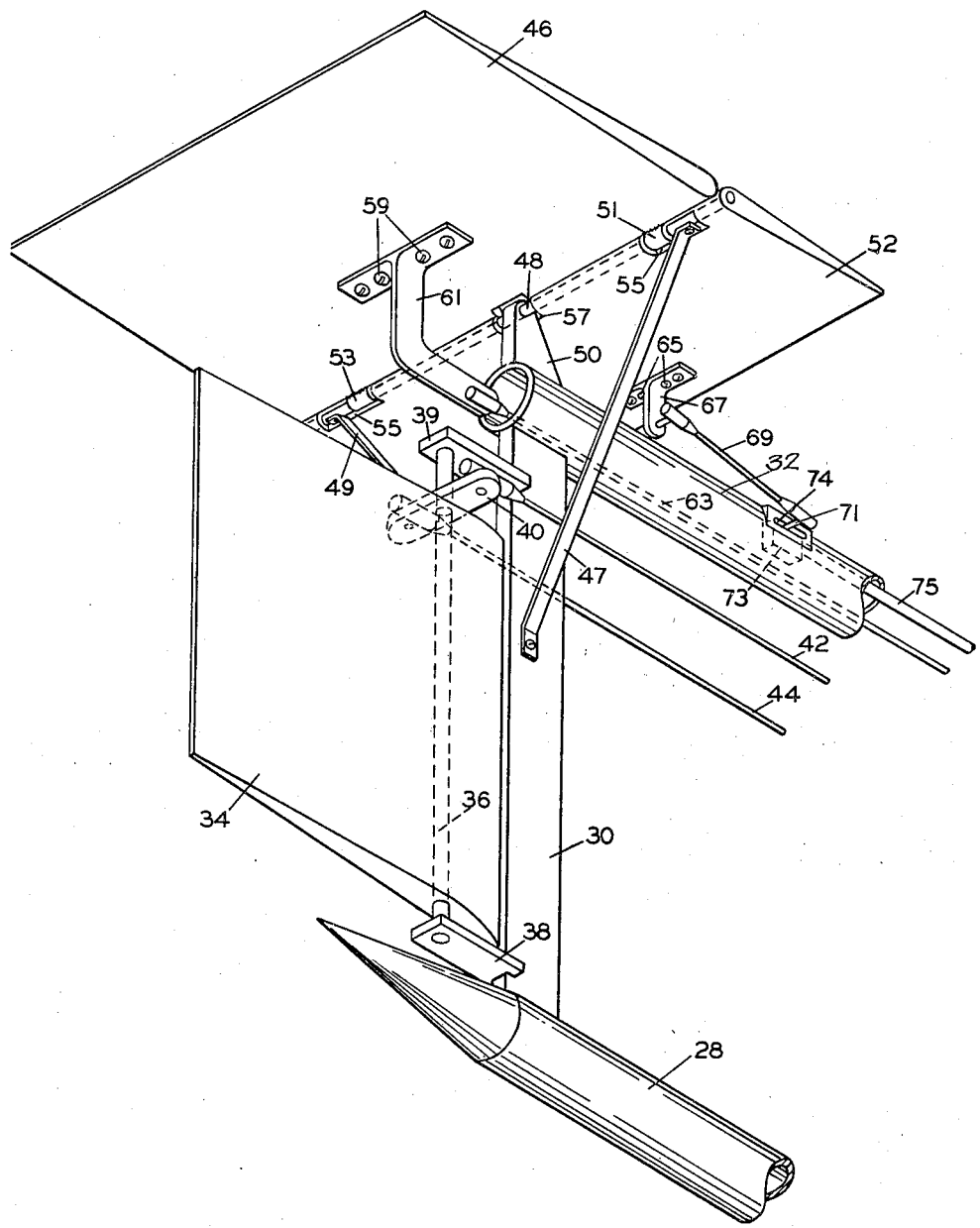
Fig. 1A is a perspective view of the rudder, elevator and stabilizer arrangement.

Two tubular longerons 28 and 32 are welded to the trailing edge of the streamlined chambers 14 and 16 of the nacelle 15. Lower longeron 28 is positioned at a point near the flat bottom of chamber 16, while upper longeron 32 is positioned directly above as shown. The rear ends of these two longerons are joined together, as by welding, with a strut 30, as best seen in Fig. 1A. This longeron structure is used to support the rudder, elevator and stabilizer, as will now be more fully described.

Rudder 34 is shaped as shown in Figs. 1 and 1A, having a sharp leading edge, and it is rotatably mounted upon vertical shaft 36 which is partially within the rudder 34 positioned some distance from the leading edge of the rudder to provide a balanced rudder. The lower end of vertical shaft 36 is fixedly mounted within bracket 38 which is welded to strut 30 while the upper end of shaft 36 is fixedly positioned in another bracket 39 which also is welded to the same strut. Lever 40 is rigidly affixed to the top of rudder 34, this lever being rotatably mounted upon shaft 36. A pair of links 42 and 44 emerge from the lower rear portion of chamber 14, link 42 being pivotally connected to the right end of lever 40 and link 44 being pivotally attached to lever 40 at a point upon the other side of shaft 36. Means for actuating links 42 and 44 will be later described.

Above rudder 34 is elevator 46, directly ahead of which and in the same plane is horizontal stabilizer 52, both rotatably mounted on transverse rod 48. As best seen in Fig. 1A rod 48 is fixedly mounted in bracket 50 which is welded on the top side of longeron 32 directly above strut 30. Braces 47 and 49 have their lower ends affixed to strut 30 and their upper ends to rod 48 to support the left and right ends, respectively, of transverse rod 48.

Welded to the leading edge of elevator 46 are a pair of sleeves 51 and 53 which encircle rod 48 to allow elevator 46 to pivot thereabout. A pair of slots 55 are provided in the trailing edge of horizontal stabilizer 52 to allow the sleeves 51 and 53 to encircle rod 48, and also to provide openings for braces 47 and 49 to attach to rod 48. The rear edge of stabilizer 52 is slotted at 57 to allow bracket 50 to engage shaft 48. Inasmuch as the trailing edge of stabilizer 52 is rotatably mounted upon rod 48, elevator 46 and stabilizer 52 are free to swing about rod 48 for purposes which will be more fully described later.

Affixed by means of screws 59 to the lower side of elevator 46 is curved bracket 61 to the forward end of which is pivotally connected the rear end of link 63, the greater part of which is within longeron 32. Likewise affixed to the lower side of stabilizer 52 by means of screws 65 is bracket 67 to the lower end of which is pivotally connected the rear end of link 69, the forward end of which is pivotally mounted upon transverse stub shaft 71 which is integral with block 73 within longeron 32. A slot 74 in longeron 32 allows reciprocation of link 75 within the longeron, the rear end of this link 75 being connected to block 73. Means for actuating links 63 and 75 will be later pointed out.

Referring now to Fig. 1, from the leading edge of chamber 14 and at a point near its upper flat surface 29 a bearing housing 56 integral with chamber 14 is provided. Shaft 58 is rotatably mounted in suitable bearings (not shown) in housing 56 and has rigidly affixed to its outwardly extending end propeller 60. This propeller 60 is preferably a Hyde type 12 inch diameter, 12 inch pitch. The axis of rotation of this propeller, if extended, would be slightly below a line connecting the leading edges of the wings 18 and 20.

The location of the propeller a substantial distance ahead of the wings and at about the same height as the wings is important so that the wash of the propeller may be utilized to give added "lift" to the wings. When so placed it is believed that most of the wash of the propeller passes over and in contact with the top of the wings, reducing the pressure thereon and thereby resulting in more "lift." Extensive experimentation was required to find the best position to locate the propeller.

Rigidly attached to the bottom of a frame (not shown) supporting fuselage 10 are a pair of transverse spans 62 and 64 and rigidly affixed to one of the outer ends of each of these two spans is a pontoon 66 or 68.

Attached to the rear of fuselage 10 is a detachable stationary rudder 70 simulating the rudder of a real plane. One end of guide rod 72 is attached to this rudder as shown, the other end of which is fastened to the top of fuselage 10 just to the rear of the seat 76 within fuselage 10. This rod 72 and a pair of guides 77 (only one shown) act as guides upon which transparent, slidable hood 79 travels when opening and closing the entrance to the cockpit 74. Ahead of seat 76 within cockpit 74 are the instrument panel 78 and control stick 80. The throttle control lever is designated 82, while a windshield 83 is also provided.

Fuselage 10 is preferably watertight and is provided with side paneling (not shown) separated from the outside of the fuselage and with a floor (not shown) also separated from the bottom of the fuselage. This arrangement is provided as will be better later understood in order that certain of the parts of the invention may be free from danger of being damaged by the operator.

*Forward speed and lift*

Figure 2:
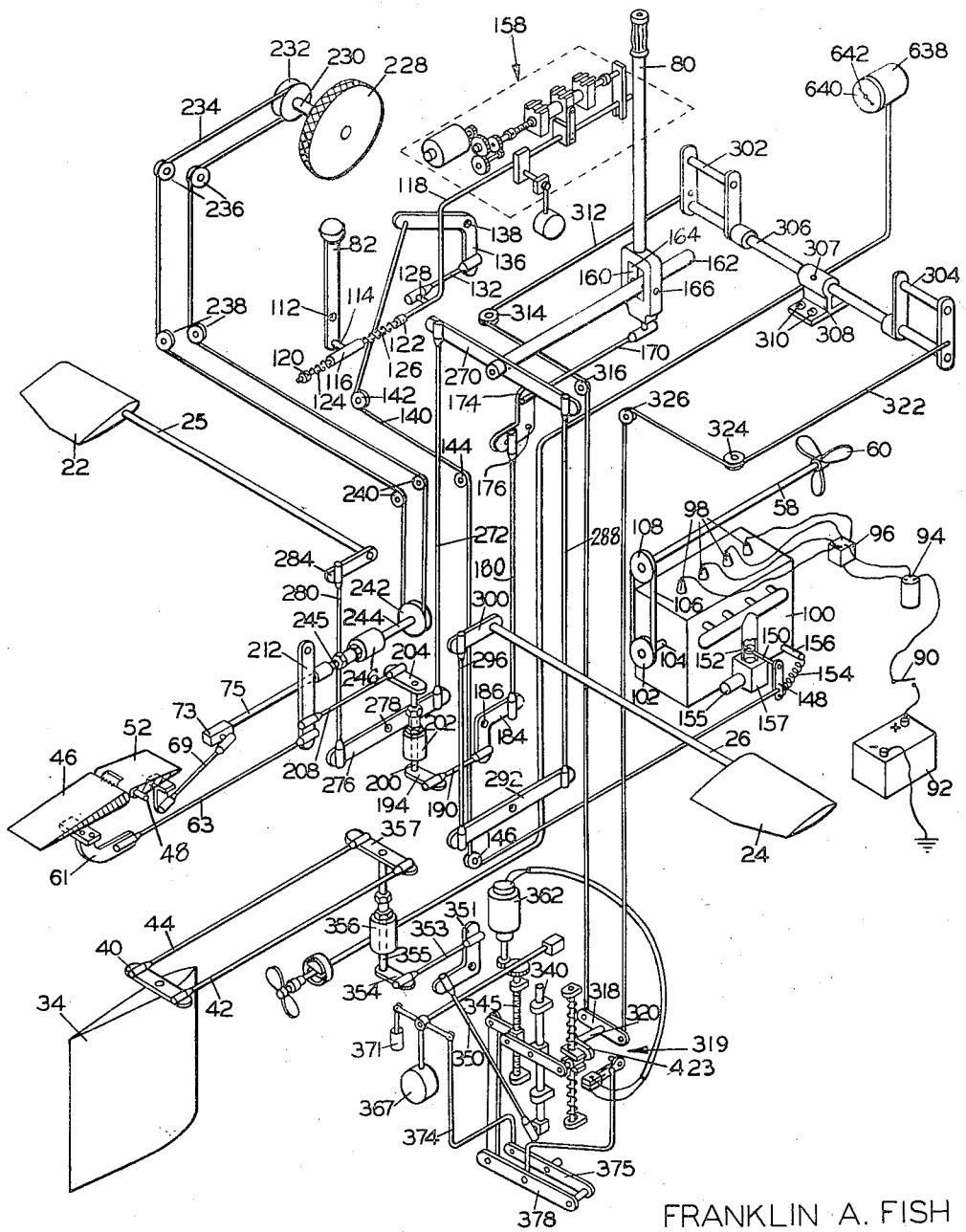
Fig. 2 is a schematic view of the means connecting the control stick with the elevator and ailerons as well as the means connecting the rudder pedals with the rudder. The horizontal stabilizer means, means for accomplishing automatic turn with bank, delayed action throttle control means, the engine and battery and other parts of the invention are also shown in Fig. 2.
Figure 4:
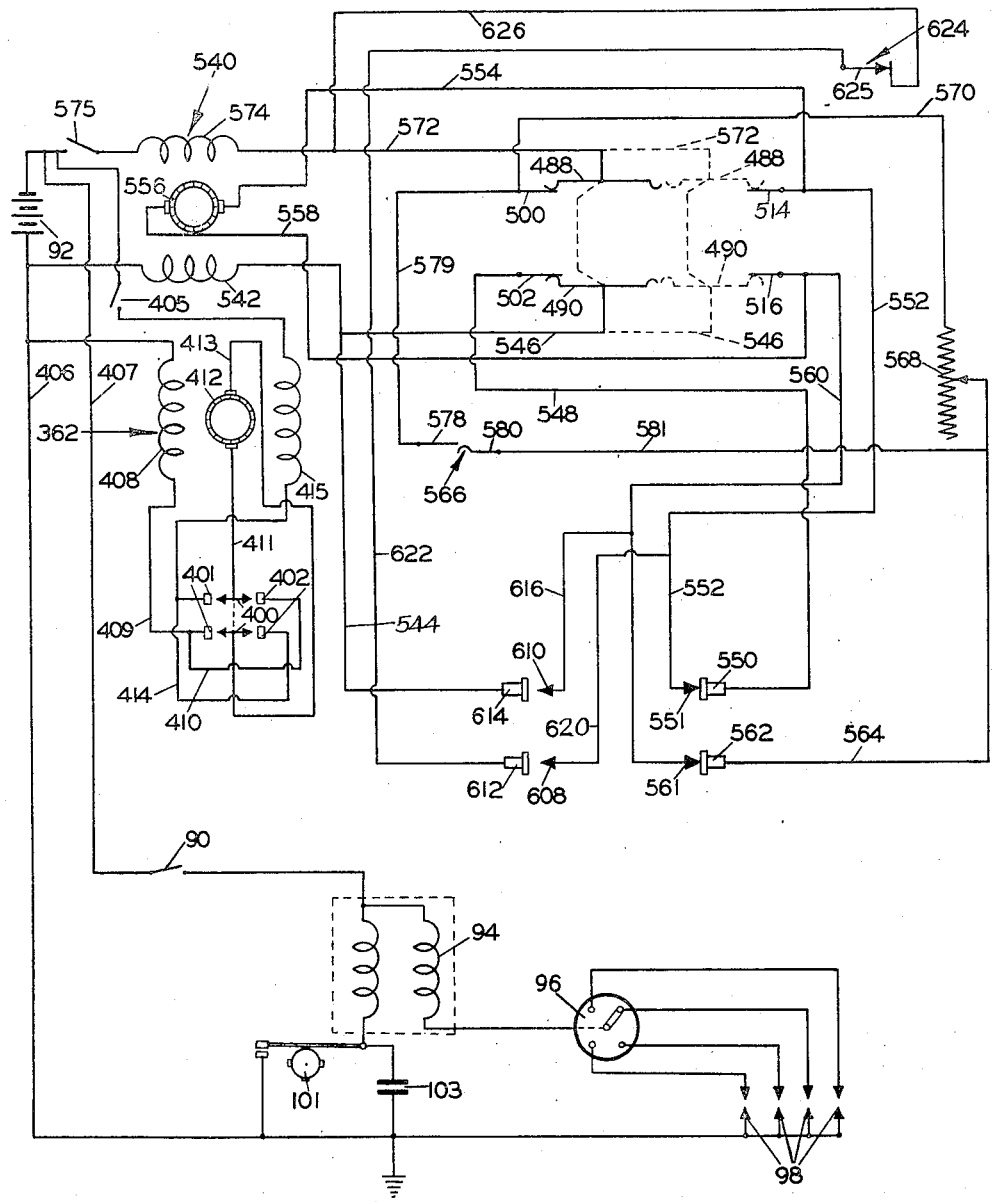
Fig. 4 is a schematic diagram of the electrical wiring of the preferred embodiment of this invention.

Reference is now made to Figs. 2 and 4 which show the ignition switch 90. When this switch is closed battery 92 is connected to coil 94 which in turn is connected to the distributor 96 which is connected to the spark plugs 98 of the four cylinder 25 horsepower engine 100. A conventional timing device 101 and condenser 103 seen in Fig. 4 are also provided. A conventional starter button and choke (not shown) may be used to start engine 100. The ignition system is, therefore, of a conventional type.

When engine 100 is started the V-pulley 102 rigidly mounted upon the output shaft 104 of the engine will be rotated, and by means of V-belt 106 pulley 108 which is rigidly affixed to the shaft 58 of propeller 60 will be rotated. Actually, there are provided four V-pulleys 102, four V-belts 106 and four V-pulleys 108 but for the sake of simplicity only one of each of these members is shown in Fig. 2. Referring to Fig. 6 battery 92 is preferably located, for weight distribution, within lower chamber 16 toward the leading edge 23 of this chamber and engine 100 is located immediately therebehind. V-pulley 102 is within chamber 16 while V-pulley 108 is within upper chamber 14 as is the propeller shaft 58. As previously explained, the forward end of propeller shaft 58 is rotatably mounted within bearing housing 56 while the rearward end of this shaft is rotatably mounted within a bracket (not shown) rigidly attached to the inside of chamber 14.

Also shown in Fig. 2 is the throttle lever 82 to which reference has been previously made. As seen in Fig. 1 this throttle is pivotally mounted in bracket 110 which is rigidly affixed to the interior of the left side of the cockpit at a point ahead of seat 76. Throttle 82 pivots about the point designated in Fig. 2 by the number 112, and rigidly affixed to the bottom end of this throttle is stud 114, the other end of which in turn is rigidly affixed to sleeve 116. A second sleeve (not shown) is inside sleeve 116 and affixed to link 118. Fixedly mounted upon link 118 are a pair of stops 120 and 122. Encircling link 118 and between sleeve 116 and stop 120 is a compression spring 124 while a second compression spring 126 encircles link 118 and is between the other end of sleeve 116 and stop 122.

Fixedly attached to link 118 at a point ahead of stop 122 is stud 128 upon the outer end of which is pivotally mounted the rear end of link 132. The forward end of link 132 is pivotally connected to the lower arm of bell crank 136. This bell crank is behind the instrument panel 78 shown in Fig. 1 and is pivotally mounted at the point 138 upon a shaft (not shown) which may be fixed to the left inner side of fuselage 10. Affixed to the upper end of bell crank 136 is flexible cable 140 which extends downwardly and encircles pulley 142 which is rotatably mounted at a point near the bottom of fuselage 10 transverse of hollow central vertical column 12. Cable 140 then runs transversely along the bottom of fuselage 10 below the floor of the fuselage and encircles pulley 144 which is rotatably mounted in a member (not shown) near the upper opening of vertical column 12. Cable 140 then runs downwardly along the inside of vertical member 12 and encircles pulley 146 which is rotatably mounted upon a member (not shown) near the bottom of chamber 16. Cable 140 then runs forward along the bottom of chamber 16 and its other end attaches to arm 148 which has its upper end rigidly attached to shaft 150 upon which is rigidly affixed butterfly valve 152 which controls the flow of mixture from carburetor 157 to engine 100. Air is admitted to lower chamber 16 by means of chamber 14 and column 12, and the carburetor air intake 155 may be provided with a conventional choke valve. A tension spring 154 has one end attached to arm 148 at a point below where cable 140 attaches thereto, and the other end of spring 154 is rigidly affixed to stud 156 which is rigidly attached to engine 100.

Still referring to Fig. 2 and bearing in mind the preceding structural arrangement, a pushing forward of throttle lever 82 (to the right as seen in Fig. 2), which movement simulates the opening of the throttle of a real plane in actual flight, results in a movement to the rear of the lower end of throttle lever 82, sleeve 116 goes in the same direction and by means of compression spring 124 and stop 120 link 118 is moved to the rear. Link 132 and the lower end of bell crank 136 will therefore move in the same direction and the upper end of bell crank 136 moves upwardly, thereby pulling in that direction the end of cable 140 which is attached thereto. The other end of cable 140 will therefore move to the rear and the lower end of arm 148 will move in the same direction against the action of spring 154. Butterfly valve 152 will rotate in a clockwise direction as seen in Fig. 2 and will be opened, admitting more mixture to engine 100. The speed of engine 100 will be increased. If the throttle were not in a completely closed position it will be understood that a pulling to the rear of the upper end of the throttle lever (a movement to the left in Fig. 2), which movement simulates the closing of the throttle in a plane in actual flight, butterfly valve 152 by virtue of the action of tension spring 154 will be rotated in a counterclockwise direction as seen in Fig. 2 to a more closed position. The speed of engine 100 will then be reduced.

The relation of the delayed action throttle assembly designated generally in Fig. 2 by 158 to the throttle lever 82, butterfly valve 152, and associated parts will be later described.

Figures 9, 10, 11:
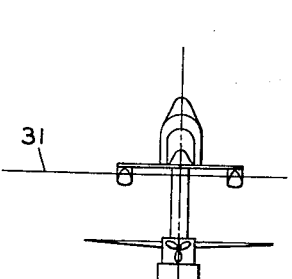
Figs. 9–13 show various positions of the device with respect to the water.

The preceding description has disclosed means whereby the opening and closing of throttle 82 may control the speed of engine 100 and, therefore, the speed of propeller 60. When engine 100 is not running, is idling, or is running only fast enough to move the device through the water at a relatively slow rate, the pontoons 66 and 68 are partially submerged, as seen in Fig. 9, the pontoons providing the necessary buoyancy to prevent the device from sinking. When throttle 82 is opened sufficiently far, engine 100 drives propeller 60 at an increased rate to cause the apparatus to move through the water at several miles per hour. When the speed of the forward movement of the apparatus reaches a given point the coaction of the wings 18 and 20 and ailerons 22 and 24 with the water provides sufficient lift that the whole device moves upwardly so that the pontoons 66 and 68 leave the water and the central vertical column 12 emerges from the water to an increasing extent. The degree of emergence of the apparatus from the water depends in part upon the amount of lift which in turn depends upon the speed of propeller 60 which governs the rate of forward movement of the apparatus through the water. This results from the fact that as the wings 18 and 20 and ailerons 22 and 24 move through the water at an increased rate the lift produced thereby increases and is sufficient to support a greater proportion of the apparatus above the water in spite of the loss of the buoyancy resulting from the pontoons completely leaving the water and the central column 12 partially coming out of the water. It is possible with the apparatus of this invention to achieve sufficient forward speed of the device to lift all of the apparatus above the top of the propeller out of the water. This situation is shown in Fig. 10 where the horizontal line 31 designates the surface of the water. However, as soon as the propeller emerges its driving effect is lost, forward speed drops and, consequently, the device settles in the water until the propeller is again submerged.

Referring again to Fig. 2, the control stick 80 is shown, the integral bottom portion of which is formed as an enclosed fork 160. Longitudinal shaft 162 extends through the opening 164 of fork 160, being pivoted to the sides of the fork by pin 166. This shaft 162 is rotatably mounted within brackets (not shown) between the floor of the cockpit and the bottom of fuselage 10. It can readily be seen that this arrangement provides for the easy movement of the stick 80 fore and aft and side to side, in simulation of the movements of a real control stick in a real plane. The forward end of link 170 is pivotally attached to fork 160 and the other end of link 170 is pivotally connected to the upper arm of bell crank 174 which is pivotally mounted about the point 176 by means of a shaft and brackets (not shown) which are positioned along the center line of the bottom of fuselage 10 near the point where the rear edge of hollow vertical column 12 joins fuselage 10. The upper end of vertical link 180 is pivotally connected to the other arm of bell crank 174 and the lower end of link 180 is pivotally connected to the forward arm of bell crank 184 which is pivotally mounted about the point 186 as seen in Fig. 6. To the other arm of bell crank 184 is pivotally connected the front end of link 190, to the other end of which is pivotally connected the right end of arm 194. The other end of this arm is rigidly affixed to vertical shaft 200 which passes through a conventional stuffing box 202 which is also positioned as seen in Fig. 6. Stuffing box 202 provides a watertight fitting for reasons which will later be described.

To the upper end of vertical shaft 200 is affixed arm 204 upon the movable end of which is pivoted the forward end of link 208. The other end of link 208 is pivotally connected to generally vertical arm 212 which is pivotally connected at its upper end to the bracket 214. The forward end of link 63 is pivotally connected to arm 212 as shown, the other end of which is pivotally attached to curved bracket 61 which is best seen in Fig. 1A. It will be recalled this bracket is affixed to the lower side of elevator 46 by means of screws 59. As described before sleeves 51 and 53 are welded to the leading edge of elevator 46 permitting elevator 46 to swing about rod 48.

Figures 12, 13:
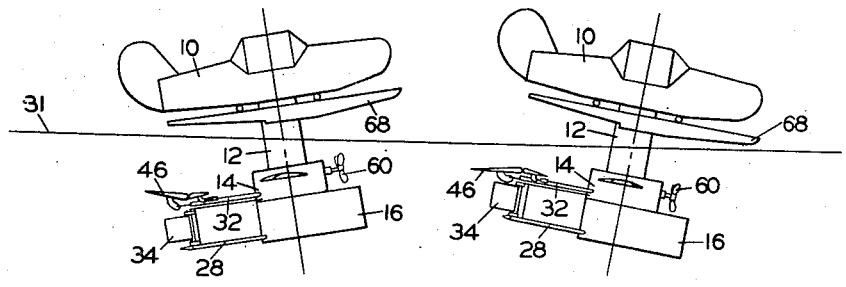

Referring, for purposes of comparison to a plane in actual flight, when the control stick of the plane is pushed forward the elevator pivots about its leading edge and the rear end of the elevator goes down. The interaction of the elevator and the air through which the plane is flying results in a greater lift upon the tail of the plane, the tail goes up and, therefore, the plane assumes a diving position. On the other hand, if the control stick be moved rearwardly the elevator responds in the opposite manner and the plane assumes a climbing attitude. Referring now to Fig. 2, when control stick 80 is pushed forward, fork 160 will pivot about pin 166 and link 170 moves to the rear. The upper end of bell crank 174 moves to the rear while its other end and link 180 move downwardly. The end of bell crank 184 connected to link 180 will move in the same direction and the other arm of this bell crank will move to the rear. Link 190 therefore moves in the same direction and arm 194 is rotated in a clockwise direction as seen from above. Shaft 200 and arm 204 are rotated in the same direction and, consequently, link 208 moves ahead as does the bottom of lever 212, link 63 and curved bracket 61. Elevator 46 will therefore be pivoted about rod 48, the rear end of the elevator being lowered. If the device is moving through the water at an appreciable rate the increased pressure of the water upon the lower surface of elevator 46 will cause the rear end of the device to move upwardly and therefore the fuselage 10 assumes a diving position. This situation is shown in Fig. 13. Therefore, a pushing ahead of control stick 80 causes fuselage 10 to assume a diving attitude just as the pushing ahead of the control stick in a real plane causes the plane to assume a diving attitude.

It is deemed unnecessary to explain in detail that when control stick 80 is moved to the rear of its neutral position link 170 and the parts controlled thereby will move in the opposite direction from that just illustrated and the rear end of elevator 46 will be moved upwardly from its neutral position. The increased pressure upon the upper side of elevator 46 caused by the interaction of the elevator and the water through which the device is moving will result in a lowering of elevator 46 and of the rear end of the apparatus. Fuselage 10 will therefore assume a climbing position, as shown in Fig. 12.

The effect of the movements of elevator 46 in response to the movements of control stick 80 of course depend upon the speed of the elevator 46 through the water. In the event engine 100 is merely idling the device settles in the water as shown in Fig. 9 and makes very slight forward movement through the water. Consequently fore and aft movement of control stick 80 will not cause the device to assume a climbing or diving attitude. However, as the speed of the engine is increased in response to the movements of throttle 82 and the device moves forward through the water at an increased rate, the effect of the movements of elevator 46 upon the climbing and diving of the fuselage 10 increases proportionately.

Referring again, for the purposes of comparison, to the operation of a real plane, the pilot may cause the plane to leave the ground by neutralizing the fore and aft position of the control stick in the plane, thereby centering the elevator and then by an opening of the throttle cause the plane to increase its speed down the runway or water until the resulting lift is sufficient to raise the craft into the air. However, such is not the normal procedure. Instead, the pilot, with the control stick and elevator in a generally neutral position, directs the plane down the runway or water until he knows that sufficient speed has been realized so that upon a pulling back of the control stick in the plane and a resulting upward movement of the rear edge of the elevator, the tail of the plane will go down, increasing the angle of attack of the wings, thereby increasing lift sufficiently to cause the plane to clear the ground or water. The apparatus of this invention may be controlled to simulate this phase of real flight. When the operator in the fuselage 10 knows that the device is moving through the water at a sufficiently rapid rate that a pulling backward of the control stick 80 will cause the rear end of elevator 46 to rise, forcing the tail of the device downwardly and increasing the angle of attack of the wings 18 and 20 with respect to the water to produce a sufficient increase in lift, he may pull back on the control stick 80 and the resulting increased lift will cause the pontoons as well as the upper part of central column 12 to rise out of the water, thereby simulating the leaving of the ground or water of a real plane.

*Horizontal stabilizing means*

In an airplane means are provided whereby the pilot may "trim" the ship so that it will fly in level flight without the pilot holding the control stick in a given position. These means comprise generally a hand wheel which may be manually turned by the pilot, the turning of the hand wheel positioning the horizontal stabilizer about its transverse axis until the lift upon the tail group of the ship is right to keep the plane in level forward flight. Means for accomplishing the same results in the apparatus of this invention will now be disclosed.

Referring to Figs. 1 and 2 there is disclosed inside cockpit 74 upon the left side thereof a hand wheel 228 which is fixed upon horizontal transverse shaft 230 which is suitably held by brackets not shown. Rigidly affixed upon the other end of this shaft is pulley wheel 232 and encircling this wheel is an endless cable 234. Two pulleys 236 are suitably rotatably mounted between the paneling along the side of the cockpit and the left side of fuselage 10 and both branches of endless cable 234 extend horizontally and rearwardly from pulley 232, each branch coacting with one of the pulleys 236 and extending downwardly between the left paneling and left side of fuselage 10. A second pair of pulleys 238 are suitably rotatably mounted upon the left side of fuselage 10 at a point below the floor of the fuselage and each branch of endless cable 234 coacts with one of these pulleys 238, both branches running transversely of the fuselage between the floor and bottom of fuselage 10. A third pair of pulleys 240 are provided, these pulleys being mounted between the floor and bottom of the fuselage at a point near the junction of hollow central column 12 and the bottom of fuselage 10. Each branch of endless cable 234 coacts with one of these pulleys 240 and then extends downwardly within central column 12 where the endless cable encircles pulley wheel 242 rigidly affixed upon a shaft 244 which passes through stuffing box 246 seen in Fig. 6. Shaft 244 is suitably threaded at 245 for coaction with nut 248 which is integral with rod 75 better seen in Figs. 1A and 2. Rod 75 has rigidly affixed to its rear end block 73. The arrangement of block 73 and the elements connecting it with horizontal stabilizer 52 has been previously pointed out.

In view of the provision of the elements just described it will be understood that a rotation of hand wheel 228 will cause a rotation of pulley 232 which, by means of endless cable 234 and the guide pulleys previously pointed out, will cause a rotation of pulley 242. Shaft 244 will therefore be rotated and by virtue of the coaction of the threads 245 of shaft 244 and nut 248, shaft 75 will move toward the head or rear of the apparatus. Block 73, stud 71 and link 69 will move accordingly and by means of bracket 67 horizontal stabilizer 52 will be rotated about rod 48 to raise or lower its leading edge. In the event hand wheel 228 is moved in a direction to raise the leading edge of horizontal stabilizer 52 the coaction of the water and horizontal stabilizer 52 will cause an increase in pressure upon the under side of the stabilizer, the rear of the device will go up and the front of fuselage 10 will go down. On the other hand a rotation of hand wheel 228 in the opposite direction will cause the leading edge of horizontal stabilizer 52 to go down and the pressure upon the upper side will increase and the rear end of the apparatus will go down. Consequently, the front of fuselage 10 will rise.

When the student in the fuselage 10 is "flying" the device so that the pontoons and the upper part of central column 12 are out of the water, if the student finds that he must hold back slightly upon control stick 80 to keep the device in level flight he may, by means of hand wheel 228, adjust the position of horizontal stabilizer 52 in a manner to lower the leading edge of stabilizer 52. The pressure of the water upon the upper side of the stabilizer will be increased and the apparatus will then assume a position of level flight without the necessity of holding back upon control stick 80. Similarly, if the student finds that he has to hold the control stick slightly forward to keep the device in level flight a rotation of hand wheel 228 in the opposite direction from the case just cited will cause the leading edge of stabilizer 52 to rise, increasing the pressure of the water upon the lower side of this stabilizer and thereby keeping the trainer in level flight.

This invention therefore provides means whereby a student in the trainer may manually adjust the position of the provided horizontal stabilizer to keep the apparatus in level "flight," thus making it unnecessary for him to maintain pressure on the control stick to achieve the desired flight attitude.

Banking means

It has been previously pointed out that within fuselage 10 there is provided a control stick 80 formed integrally with fork 160 through the opening 164 of which horizontal longitudinal shaft 162, extends, it being pivoted to the sides of fork 160 through pin 166. Shaft 162, as stated, is rotatably mounted within a pair of brackets (not shown) between the floor of the cockpit 74 and the bottom of fuselage 10. As seen in Figs. 2 and 6, to the rear end of shaft 162 is rigidly affixed lever 270 to the left end of which is connected vertical link 272 which is inside the vertical hollow central column 12. The bottom of link 272 is pivotally connected to the fore end of lever 276 which is pivoted about the point 278. To the rear end of lever 276 is pivotally attached the lower end of vertical link 280, and the upper end of link 280 is pivotally connected to the rear end of arm 284, the forward end of which is rigidly affixed to horizontal transverse shaft 25 which, as has been previously stated in connection with the description of Fig. 1, is rotatably mounted within wing 18 and extends to the outer edge of aileron 22, aileron 22 being rigidly mounted upon shaft 25 for rotation therewith.

To the right end of lever 270 is pivotally connected the upper end of vertical link 288 which corresponds to vertical link 272. The lower end of vertical link 288 is pivotally mounted upon lever 292 which is pivotally mounted in the same manner as lever 276. To the rear end of lever 292 is pivotally connected another vertical link 296, the upper end of which is pivotally connected to the rear end of arm 300. The fore end of arm 300 is rigidly attached to horizontal transverse shaft 26 which, as was also described in the consideration of Fig. 1, is rotatably mounted within the inside leading edge of wing 20, aileron 24 being rigidly mounted upon shaft 26 for rotation therewith.

Referring now to a plane in actual flight, when the control stick in the plane is moved to the left the trailing edge of the left aileron goes up, the trailing edge of the right aileron goes down, both ailerons pivoting about points near their leading edges. The increase in pressure caused by the impact of the air through which the plane is flying upon the top of the left aileron and the bottom of the right aileron causes the left wing to go down and the right wing to go up. The plane therefore banks to the left. On the other hand, when the control stick in the plane is moved to the right the ailerons respond in the opposite manner causing the right wing to go down, the left wing to go up, and the plane banks to the right.

Consideration of the movements of the just described parts of this invention will show that the ailerons 22 and 24 of the device being described respond to movements of the control stick 80 just as the ailerons in a real plane respond to corresponding movements of a control stick in a real plane, e. g., when control stick 80 is moved to the left pin 166 causes a rotation of shaft 162, the left end of lever 270 and link 272 go down while the right end of lever 270 and link 288 go up. Consequently, the fore end of lever 276 goes down, the other end of this arm goes up as does link 280 and the rear end of arm 284. Shaft 25 is rotated clockwise as seen from the right side of the device and the trailing edge of aileron 22 goes up. Simultaneously, with these motions the fore end of arm 292 goes up, its rear end goes down as does link 296 and the rear end of arm 300. Shaft 26 is therefore rotated counterclockwise as seen from the right side of the device and the trailing edge of aileron 24 goes down. Therefore, a moving to the left of control stick 80 causes the trailing edge of aileron 22 to go up and the trailing edge of aileron 24 to go down, these ailerons turning with the shafts 25 and 26 upon which they are respectively mounted. Consequently, if the device is moving along through the water at an appreciable rate of speed the movement upward of the rear end of aileron 22 will result in an increased pressure upon the upper surface of this aileron as a result of the coaction of the aileron with the water. This increased pressure will therefore tend to bank the trainer to the left. At the same time, the movement downward of the rear end of aileron 24 will result in an increased pressure upon the lower side of this aileron also tending to bank the trainer to the left. This situation is shown in Fig. 11. It will be seen therefore that when the device is traveling at an appreciable speed through the water a movement of control stick 80 to the left causes a banking of the device to the left just as the movement to the left of the control stick in a real plane causes a banking to the left of the plane.

It is deemed unnecessary to show in detail that a movement to the right of control stick 80 will result in opposite movements of the ailerons 22 and 24 resulting in an increase in pressure upon the upper surface of aileron 24 and an increase in pressure upon the lower surface of aileron 22, thereby causing the apparatus to bank to the right.

*Turning means*

In a plane in actual flight when the left rudder pedal is pressed forward the rear edge of the rudder in the plane goes to the left, the rudder pivoting about a point near its leading edge. The interaction of the rudder with the air through which the plane is flying causes an increased pressure upon the left side of the rudder, the tail of the plane is therefore pushed to the right resulting in a turning of the plane to the left. On the other hand, if the right rudder pedal is pressed forward the trailing end of the rudder moves to the right, a greater pressure upon the right side of the rudder results, moving the tail of the plane to the left and causing the plane to turn to the right. The following means are incorporated in this invention in order that the device being described will turn to the left or right depending upon whether the left or right rudder pedal is pressed forward by the student "flying" the apparatus.

Reference is made to Fig. 2 where there is shown the left rudder pedal 302 and the right rudder pedal 304, each of these pedals being rotatably mounted upon horizontal transverse shaft 306 which in turn is fixedly mounted by means of set screw 307 within bracket 308 which is affixed by means of screws 310 to the bottom of the fuselage 10 at a point ahead of the seat 76 in the cockpit. Cable 312 is attached to left rudder pedal 302 as shown, this cable running along the left side of fuselage 10 between the floor in the cockpit and the bottom of fuselage 10. Pulley 314 is suitably mounted between the floor of the cockpit and the bottom of the fuselage at a point near the left side of the fuselage opposite central column 12. Cable 312 is carried by pulley 314 and turns at this pulley to run transverse of fuselage 10 to pulley 316 which is suitably rotatably mounted near the point where member 12 joins the bottom of fuselage 10. At pulley 316 cable 312 goes down central column 12 and is affixed to the left end of lever 318 which is rigidly affixed upon the forward end of shaft 320. Lever 318, shaft 320 and the assembly designated 319 shown in the bottom of Fig. 2 are located as seen in Fig. 6. Also seen in Fig. 2 is the cable 322 which is attached to right rudder pedal 304 as shown, and by means of pulleys 324 and 326, which pulleys are located upon the right side of the device at points corresponding to the locations of pulleys 314 and 316 upon the left side, cable 322 connects with the right side of lever 318.

A pushing forward of left rudder pedal 302 results in a movement forward of the end of cable 312 which is connected to this rudder pedal and the left end of lever 318 goes upwardly. The right end of this arm goes downward as does the end of cable 322 which is connected thereto. Rudder pedal 304 therefore moves to the rear. On the other hand, a pressing forward of rudder pedal 304 causes a raising of the right end of lever 318 and a lowering of the left end of this lever. By means of cable 312 left rudder pedal 302 moves to the rear. The movement to the rear of one rudder pedal simultaneously with a pressing forward of the other simulates the movement to the rear of one rudder pedal in a real plane simultaneously with a pressing forward of the other.

Figure 5:
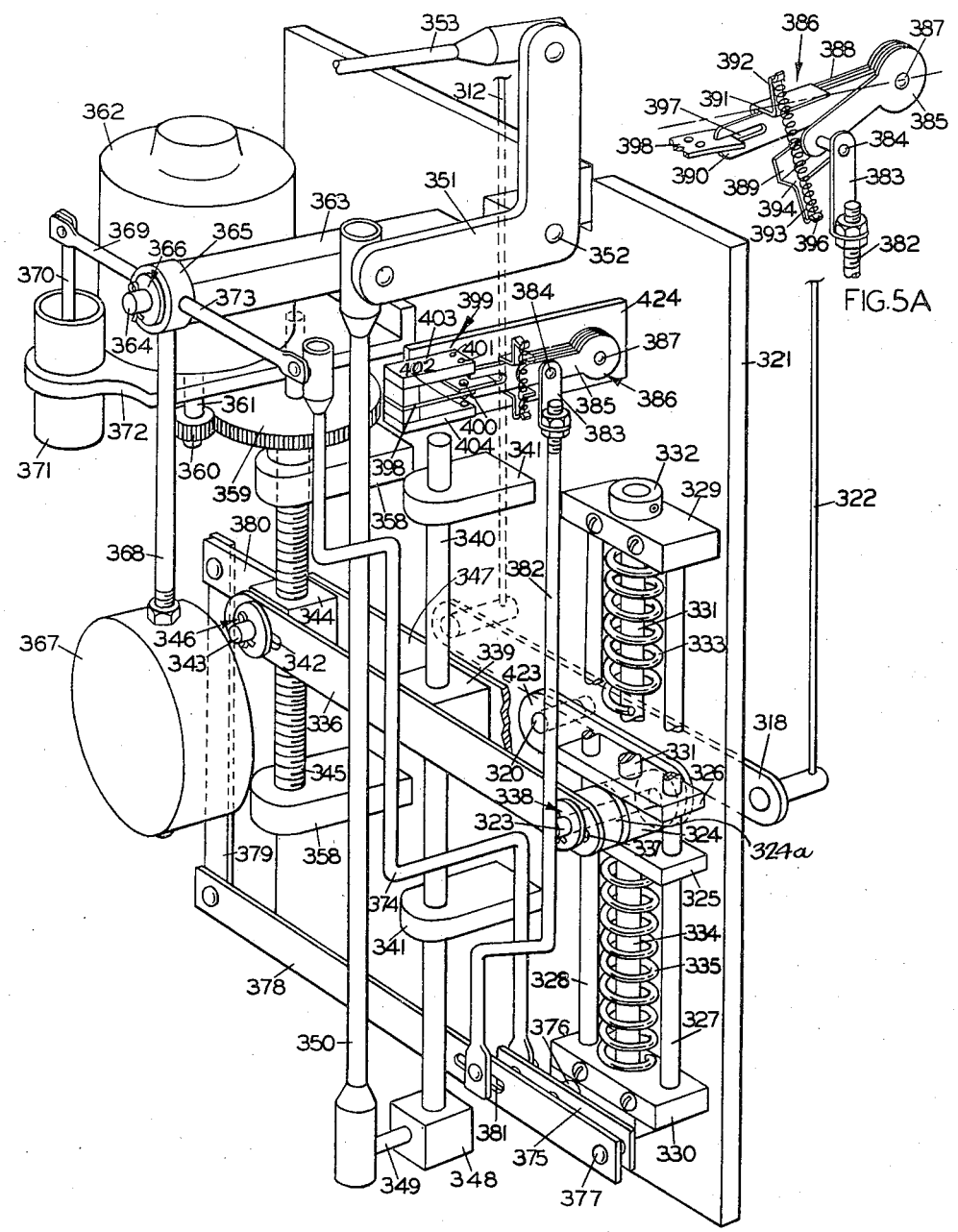
Fig. 5 is an enlarged view of the turn with bank mechanism.

Reference is now made to Fig. 5 which is an enlarged view of the unit 319 shown at the bottom of Fig. 2. Shaft 320 is rotatably mounted in vertical base 321 which is rigidly positioned as seen in Fig. 6. Fixedly mounted upon the rear end of shaft 320 is arm 423 which in turn has mounted in its other end longitudinally extending shaft 323. A roller 324 and spacer 324a are carried by shaft 323, this roller being positioned between two members 325 and 326. A pair of vertical guides 327 and 328 are rigidly held by the blocks 329 and 330 which in turn are fixedly attached to the vertical plate 321. Members 325 and 326 are free to slide upon vertical guides 327 and 328.

Another vertical guide 331 has its lower end affixed to slidable member 326 and a stop collar 332 is placed upon the upper end of member 331 above bracket 329. Spring 333 encircles rod 331, the upper end of this spring pressing against the lower side of bracket 329 and the lower end of the spring presses against slidable member 326.

Slidable rod 334 has its upper end rigidly affixed to member 325 and a collar similar to collar 332 is placed upon the lower end of rod 334 below bracket 330. Spring 335 encircles rod 334, the upper end of this spring pressing against the lower side of slide 325 and the lower end of this spring presses against the upper surface of bracket 330.

Bearing in mind this structural arrangement, when shaft 320 is turned counterclockwise as seen from the rear, roller 324 moves upwardly pressing against sliding member 326 thereby moving this member in the same direction. The upper movement of member 326 compresses spring 333 and rod 331 moves upwardly raising collar 332 above bracket 329. The collar attached to the lower end of vertical rod 334 prevents any movement of sliding member 325, rod 334 and spring 335. On the other hand, a rotation of shaft 320 in the opposite direction in response to rudder pedal movements causes roller 324 to move downwardly forcing sliding member 325 and vertical rod 334 in the same direction against the action of spring 335. Collar 332 prevents, in this instance, any movement of sliding member 326, vertical rod 331 and spring 333. It will be readily understood that in the absence of any pressure on either of the rudder pedals, the just described arrangement provides means for positively centering the rudder pedals.

Still referring to Fig. 5 lever 336 has a slot 337 through which shaft 323 passes, the right end of lever 336 being retained upon this shaft by virtue of a suitable washer and cotter pin arrangement designated 338. The intermediate point of lever 336 is pivotally connected to block 339 which is rigidly affixed upon vertical rod 340 which is free to slide in the brackets 341 which are rigidly attached to vertical plate 321. The left end of lever 336 is slotted at 342 and through this slot passes stud 343 integral with the nut 344 upon screw 345. Lever 336 is held upon stud 343 by the cotter pin and washer arrangement designated 346. A second arm 347 is parallel to the arm 336 and is attached to the block 339 and nut 344 in the same manner as just described and is mounted upon shaft 323 ahead of roller 324.

Rigidly affixed to the lower end of vertical rod 340 is the block 348 which carries a stud 349 pivotally connected to the lower end of vertical link 350. The upper end of link 350 is pivotally connected to the rear arm of bell crank 351 which is suitably pivoted about the point 352 and the forward end of link 353 is pivotally connected to the upper arm of this bell crank.

Referring now to Fig. 2 it will be seen that the rear end of link 353 is pivotally connected to horizontal arm 354 which is rigidly attached to the lower end of vertical shaft 355 which passes through stuffing box 356. Rigidly mounted upon the upper end of vertical shaft 355 is the lever 357 to the left end of which is pivotally connected the link 44 to which reference has been made during the discussion of Fig. 1A. Link 42 is attached to the other end of lever 357. The rear ends of these links are attached to the lever 40 which is rigidly affixed to the upper part of rudder 34.

It will be recalled that whenever left rudder pedal 302 is pressed forward the left end of lever 318 is raised. Shaft 320 is rotated clockwise as seen from the rear and by the action of arm 423 shaft 323 moves downwardly carrying with it the right ends of arms 336 and 347 as well as the roller 324. Member 325 is forced downwardly compressing spring 335. The movement downwardly of shaft 323 and the right ends of levers 336 and 347 causes block 339 and the vertical rod 340 to move in the same direction, levers 336 and 347 pivoting about the points where they are connected to nut 344. The downward movement of vertical rod 340 causes vertical link 350 and the rear arm of bell crank 351 to move in the same direction. Link 353 moves to the rear. Referring to Fig. 2 the right end of arm 354 likewise moves to the rear, vertical shaft 355 rotates clockwise as seen from above as does lever 357. Link 44 therefore moves ahead while link 42 moves to the rear causing arm 40 to rotate clockwise as seen from above. Rudder 34 therefore moves in the same direction. Assuming that the device is moving through the water at an appreciable rate of speed this movement of the rudder 34 in response to a pressing forward of left rudder pedal 302 results in an increase in pressure upon the left side of the rudder. The rear end of the device therefore moves to the right and the forward end to the left in simulation of the turning to the left of a real plane in actual flight in response to the application of left rudder.

It will be understood without detailed explanation that when the right rudder pedal 304 is positioned forward the roller 324 moves upwardly against the action of spring 333 and consequently the movements of the elements between the rudder 34 and roller 324 are in the opposite direction from that just described. The result is, of course, a turning to the right of the apparatus of this invention.

The provision of the longerons 28 and 32, relatively small in cross section, to hold the tail assembly is deemed important because the radius of turn is thereby reduced.

Consequently this invention provides means whereby the submerged rudder may be moved in response to a pressing forward of the left or right rudder pedals to cause the device to turn to the left or right in simulation of the turning of a real plane in actual flight to the left or right in response to corresponding movements of the rudder pedals in the plane. Positive rudder and rudder pedal centering means are also provided.

*Means for producing automatic turn with bank*

Referring again for the purposes of comparison to a plane in actual flight, when the plane is banked in response to the lateral displacement of the control stick, in the absence of any manipulation of the rudder pedals the plane turns about its vertical axis in the direction of the bank. If the plane is banked to the left it also turns to the left while if it is banked to the right it turns to the right. This automatic turning of the plane in the direction of bank is commonly referred to as automatic turn with bank. Upon returning the plane to level flight the turning ceases.

Also in the case of a plane in actual flight when the plane is banked in a given direction by applying opposite rudder the plane may be maintained in straight flight—that is, no turning as a result of the bank occurs, but the plane moves straight ahead in the banking position. On the other hand when the plane is banked in a given direction and rudder is applied in the direction of the bank, the rate of turning of the plane is greater than in the case where the only primary action is the banking of the plane.

Means for simulating these phases of actual flight in the apparatus of this invention will now be disclosed.

Referring to Fig. 5 the screw 345 is rotatably mounted in the brackets 358 which are affixed to the vertical plate 321. Rigidly attached to the upper end of screw 345 is the gear 359 which is driven by pinion 360 mounted upon the output shaft 361 of reversible motor 362. Bracket 363 is rigidly held by plate 321 and stud 364 is integral with this bracket. Pendulum hub 365 is held upon stud 364 by the washer and cotter pin arrangement 366. Pendulum 367 is affixed to the lower end of arm 368 the upper end of which is attached to hub 365. Another arm 369 has one end attached to hub 365 and pivotally connected to the other end of this arm is arm 370 which is associated with dash pot 371 held by the bracket 372 which also holds motor 362. The dash pot dampens the movements of the pendulum.

A third arm 373 is attached to hub 365 and the upper end of link 374 is pivotally connected thereto. The lower end of link 374 is pivotally connected to lever 375 which is rotatably mounted upon the fixed stud 376 carried by bracket 330. The other end of lever 375 carries a stud 377 and the right end of walking beam 378 is pivotally mounted upon stud 377. The other end of arm 378 is pivotally connected to vertical link 379 the upper end of which is pivotally connected to the arm 380 which is affixed to nut 344.

A slot 381 is provided in walking beam 378 for adjusting the position of the lower end of vertical link 382 relative to walking beam 378. The lower end of link 382 is pivotally connected to walking beam 378 at the slot 381 and affixed to the upper end of link 382 is extension 383 which has a stud 384 rotatably mounted therein. The other end of this stud is fixedly carried by the leaf 385 of the four switch actuating leaves designated generally in Fig. 5 by 386.

Referring now to Fig. 5A it will be seen that the switch actuating means 386 comprise the stud 387 which, as better seen in Fig. 5, is held by bracket 424 carried by vertical plate 321.

Three vertically disposed leaves 388, 389 and 390 are provided in addition to the previously mentioned leaf 385. All of these leaves are rotatably mounted upon the stud 387. The rearmost leaf 388 has a horizontal integral ear 391 and integral with this ear is an upwardly disposed projection 392 to which the upper end of spring 393 is connected. The leaf 389 lies adjacent leaf 388 and has a corresponding horizontal projection 394 and downwardly disposed projection 396 to which the lower end of spring 393 is connected. Leaf 390 lies between leaf 389 and leaf 385, this leaf having a groove 397 adapted to engage the contact leaf 398 of the switch designated generally in Fig. 5 by 399. Leaf 398 carries suitable contact points 400 adapted to engage the contact points 401 of the upper contact strip 403 or to engage contact points 402 of the lower contact strip 404 of switch 399, depending upon the position of leaf 385 which is controlled by the vertical position of link 382 and extension 383. Switch 399 is connected to motor 362 in the manner shown in Fig. 4 to which reference will shortly be made.

In Fig. 5 it will be seen that when link 382 is in the neutral position, leaf 385 is in the horizontal plane and therefore the tension of spring 393 similarly positions the other three leaves. Leaf 390 under these circumstances positions leaf 398 so that its contacts do not engage the contacts 401 of strip 403 nor the contacts 402 of strip 404. In this event referring to Fig. 4 where the contacts 400 are shown schematically in the neutral position, it will be understood that even though switch 405 be closed, motor 362 cannot run. However, in the event that pendulum 367 is moved in such a direction as to pull link 382 and extension 383 downwardly from the neutral position, as seen in Fig. 5A, the downward rotation of leaf 385 engages the ear 394 of leaf 389 forcing this leaf downward. The downward movement of this leaf and the tension upon spring 393 forces leaf 388 downwardly and the ear 391 of this leaf engages leaf 390 and moves it in the same direction. Contact strip 398 therefore moves downwardly and the contacts 400 upon this strip engage the contacts 402 of block 404. Referring to Fig. 4 it will be seen that when contacts 400 engage contacts 402 current may flow from the battery 92 along conductor 406 through the field winding 408 of motor 362 and along conductor 409. Current cannot flow from the contact 401 connected to conductor 409 to the contact 400 because these contacts are open and consequently it flows along conductor 410 to the upper contacts 402 and 400 of Fig. 5. Conductor 411 then carries the current through the armature and brushes 412 of motor 362 and by means of conductor 413 it is carried back through the lower contacts 400 and 402 to the conductor 414. Upper contacts 400 and 401 being open, current will flow by means of the conductor 414 through the field winding 415 of motor 362 to switch 405 and back to the battery 92. Motor 362 will therefore run in a given direction. The running of motor 362 moves the nut 344 along screw 345 and the resultant downward movement of the ends of levers 346 and 347 attached to nut 344 causes block 339 and slidable rod 340 to move up or down as the case may be. It has been previously shown that a movement of this rod 340 by virtue of the link 350, bell crank 351, link 353 and the other parts shown at the bottom of Fig. 2 connecting link 353 with rudder 34 produces a turning of the rudder.

On the other hand, assuming that the pendulum 367 is effectively displaced in the opposite direction with respect to the other parts of the unit shown in Fig. 5, the link 382 and extension 383 will move upwardly as will leaf 385. This upward movement of leaf 385 engages the ear 391 of leaf 388 forcing this leaf upwardly and by virtue of spring 393 leaf 389 moves in the same direction, the ear 394 of leaf 389 engaging the lower side of leaf 390 to move this leaf in the same direction. Consequently leaf 398 moves upwardly and the contacts 400 of this leaf engage the contacts 401 of block 403. Referring now to Fig. 4 it will be understood that when this situation prevails current will flow from battery 92 along conductor 406 through the field winding 408 and along conductor 409 to the lower contact 401. (Current will not flow along conductor 410 because contacts 400 and 402 are open.) From contact 401 current flows to lower contact 400 along conductor 413 and downwardly in Fig. 4 through the armature and brushes 412. Conductor 411 carries the current to upper contact 400 and inasmuch as this contact engages the upper contact 401, the current will flow along conductor 414 through the field winding 415 and switch 405 back to battery 92. In this instance the current flows through the field windings 408 and 415 in the same direction as in the previously outlined case but flows through the armature and brushes 412 in the opposite direction. Consequently motor 362 will turn in the opposite direction; nut 344 will move along screw 345 in the opposite direction and as previously explained the rudder 34 will be turned in the opposite direction.

Consequently it will be understood that when vertical link 382 and extension 383 are in the neutral position, motor 362 does not run. In the event this link and extension are moved downwardly from the neutral position motor 362 turns in a given direction and by the intermediately disclosed mechanism the rudder 34 is turned in a given direction to cause the device to turn about its vertical axis. On the other hand if vertical link 382 and extension 383 are moved upwardly from their neutral positions motor 362 is energized to turn in the opposite direction and rudder 34 responds accordingly to turn the device in the opposite direction.

Specifically, referring to Fig. 5, assuming that the apparatus of this invention is banked to the left, pendulum 367 of course maintains pendulum arm 368 in the vertical position. The banking of the apparatus to the left causes the fuselage 10 to move to the left of the level flight position but the chamber 16 in which the unit shown in Fig. 5 is housed moves to the right as does vertical plate 321 and all of the parts carried thereby. The effect therefore is as though pendulum 367 were moved to the left and vertical plate 321 remained stationary. Under these conditions arm 373 moves downwardly with respect to vertical plate 321 and link 374 moves in the same direction. The left end of lever 375 moves downwardly, this lever pivoting about the stud 376 and the right end of lever 374 moves upwardly carrying with it stud 377. The right end of walking beam 378 moves upwardly, the walking beam in this instance pivoting about the point at which it is attached to link 379. Link 382 and extension 383 move upwardly and as previously explained, by the switch actuating means shown in Fig. 5A, the contact leaf 398 moves upwardly and contact is made by the contacts 400 and 401. Motor 362 is energized to rotate screw 345 in such a direction that the nut 344 moves downwardly. The downward movement of nut 344 by means of the arms 336 and 347 moves the block 339 downwardly, arms 336 and 347 in this instance pivoting about the shaft 323. As has been previously shown, the downward movement of block 339 and rod 340 causes a turning of the device to the left.

Means have therefore been disclosed whereby upon a banking to the left of the device the rudder 34 is turned in the correct direction to cause a turning to the left of the device.

On the other hand assuming that the device is banked to the right, it will be understood that the effect is as though pendulum 367 were moved to the right in Fig. 5. It will be readily understood without a detailed explanation that such a movement of pendulum 367 causes link 382 and extension 383 to move downwardly and as has already been shown motor 362 will be energized to turn in the opposite direction from the case when the device was banked to the left; screw 345 will be turned in the opposite direction; nut 344 will move upwardly carrying block 339 and rod 340 in the same direction; and such a movement of rod 340 turns rudder 34 by means of the intermediate connecting parts in the direction required to turn the apparatus to the right.

Consequently means are disclosed whereby whenever the apparatus of this invention is banked to the left an automatic turning to the left occurs and when the device is banked to the right an automatic turning to the right results.

Assuming that the device has been banked to the left and by the previously described means the vertical links 382 and 383 have been moved upwardly to cause motor 362 to turn in such a direction as to move nut 344 downwardly thereby resulting in a turning to the left of the trainer, it will be understood that means must be provided for stopping motor 362 when rudder 34 has been turned through the amount necessary to produce the required amount of turn for the prevalent degree of bank. Otherwise a very slight degree of bank might result in a degree of turn all out of proportion to the amount of turn with bank experienced in actual flight.

Bearing in mind that when the device is banked to the left vertical link 382 and extension 383 move upwardly to energize motor 362 and nut 344 moves downwardly to actuate the rudder 34 referring to Fig. 5, it will be seen that as nut 344 moves downwardly link 379 moves in the same direction forcing the left end of walking beam 378 down. In this instance walking beam 378 pivots about stud 377 and as nut 344 moves downwardly link 382 and extension 383 move in the same direction. When nut 344 has moved sufficiently far downwardly, link 382 and extension 383 will have moved downwardly far enough to center the leaves designated generally 386 in Fig. 5 and motor 362 stops. The travel of nut 344 therefore neutralizes the switching leaves and at the same time increases the rate of turning. When the nut has traveled far enough to neutralize the switching leaves it has turned the rudder the correct amount, and it will be understood that this amount depends upon the amount of relative displacement between pendulum 367 and plate 321.

It will be understood without further detailed explanation that in the event the trainer is banked to the right the previously described parts operate in exactly the same manner except that their direction of action is reversed to limit the amount of turn with bank.

Therefore not only are means disclosed for producing automatic turn with bank but means are incorporated in the apparatus to limit the amount of turn in accordance with the degree of bank.

Assuming that the device has been banked in the manner discussed and the motor 362 has been energized to properly position rudder 34 to give the required degree of turn with bank and the previously disclosed limiting means have then stopped motor 362, when the device is returned to level transverse flight, means must be provided to return the rudder 34 to the neutral position in order that the turning of the apparatus will not continue. The previously disclosed parts accomplish this desired function in the following manner. Assuming that the device was banked to the left and nut 344 was moved downwardly to turn the trainer to the left and switch actuating leaves 386 had been returned to the neutral position to stop motor 362, when the device is returned to level flight, vertical plate 321 and the parts carried thereby move to the left with respect to pendulum 367. The effect is the same as though pendulum 367 were moved to the right with respect to vertical plate 321. Such a movement of the pendulum will, as previously shown, energize motor 362 in the opposite direction from which it was energized when the trainer was banked to the left and nut 344 will be moved upwardly until the leaves 386 have been neutralized. This neutralization will occur when nut 344 is centered along screw 345 and at this point rudder 34 is in the central position. Again, it is deemed unnecessary to show that the apparatus performs the same function upon recovering from a right bank.

Consequently means are provided whereby upon the returning of the device to level flight the turning of the device is stopped.

It has been stated that in the case of a plane in actual flight in the event the plane is banked it normally turns in the direction of the bank but by the application of opposite rudder the turning may be prevented. It has been shown that when the apparatus of this invention is banked to the left nut 344 moves downwardly and the device turns to the left. However, if the student presses forward right rudder pedal 304 seen in Fig. 2, cable 322 moves the right end of lever 318 upwardly as seen in Figs. 2 and 5, and consequently roller 324 moves in the same direction. The downward movement of nut 344 normally moves block 339 and rod 340 in the same direction but the upward movement of roller 324 in response to the rudder pedal movement would cancel such a movement of block 339 and rod 340. Consequently no turning of the apparatus would result.

It will be understood without a detailed explanation that if the device were banked to the right and nut 344 were moved upwardly by motor 362, the pressing forward of left rudder pedal 302 would move roller 324 down and consequently block 339 and rod 340 would remain stationary. No turning of the device would result.

Consequently this invention discloses apparatus whereby the device normally turns in the direction of the bank but the turning may be offset by an application of opposite rudder.

Again, in the case of a plane in actual flight, the plane not only normally turns in the direction of the bank but if the rudder pedal corresponding to the direction of the bank is pressed forward the degree of turn is increased. At the same time in this invention if the trainer banked to the left nut 344 moves downwardly carrying block 339 and rod 340 a given amount. Levers 336 and 347 pivot in this instance about shaft 323. If at the same time left rudder pedal 302 be pressed forward roller 324 also moves downwardly and block 339 and rod 340 are further moved downwardly. Consequently rudder 34 turns to a greater extent and the degree of turn is increased. Right bank and the application of right rudder similarly combine to move block 339 and rod 340 upwardly a greater extent than do either of these primary actions working alone to produce a greater amount of turning to the right.

Therefore means are disclosed for not only turning the device in the direction of bank but for increasing the degree of turn when corresponding rudder pedal action is applied.

*Means for delaying effect of throttle movements*

Considering again the characteristics of a real airplane when the plane is "taking off," the pilot opens the throttle and as the plane goes down the runway its speed is gradually increased for a relatively long period of time until the point is reached where the lift upon the wings is sufficient, upon a pulling back of the control stick, to cause the plane to clear the ground. When the plane clears the ground the loss of ground friction results in an increase in air speed and consequently in lift. Means for increasing the length of time between the complete opening of the throttle in the device of this invention and the time at which the wings 18 and 20 are moving through the water at a sufficiently rapid rate so that a pulling back of the control stick 80 will result in a lifting of the pontoons and upper part of central column 12 out of the water, which movement simulates the leaving of a plane from the ground or water, will now be disclosed. In the absence of such means, the trainer would be "flying" in much too short a length of time.

Figure 3:
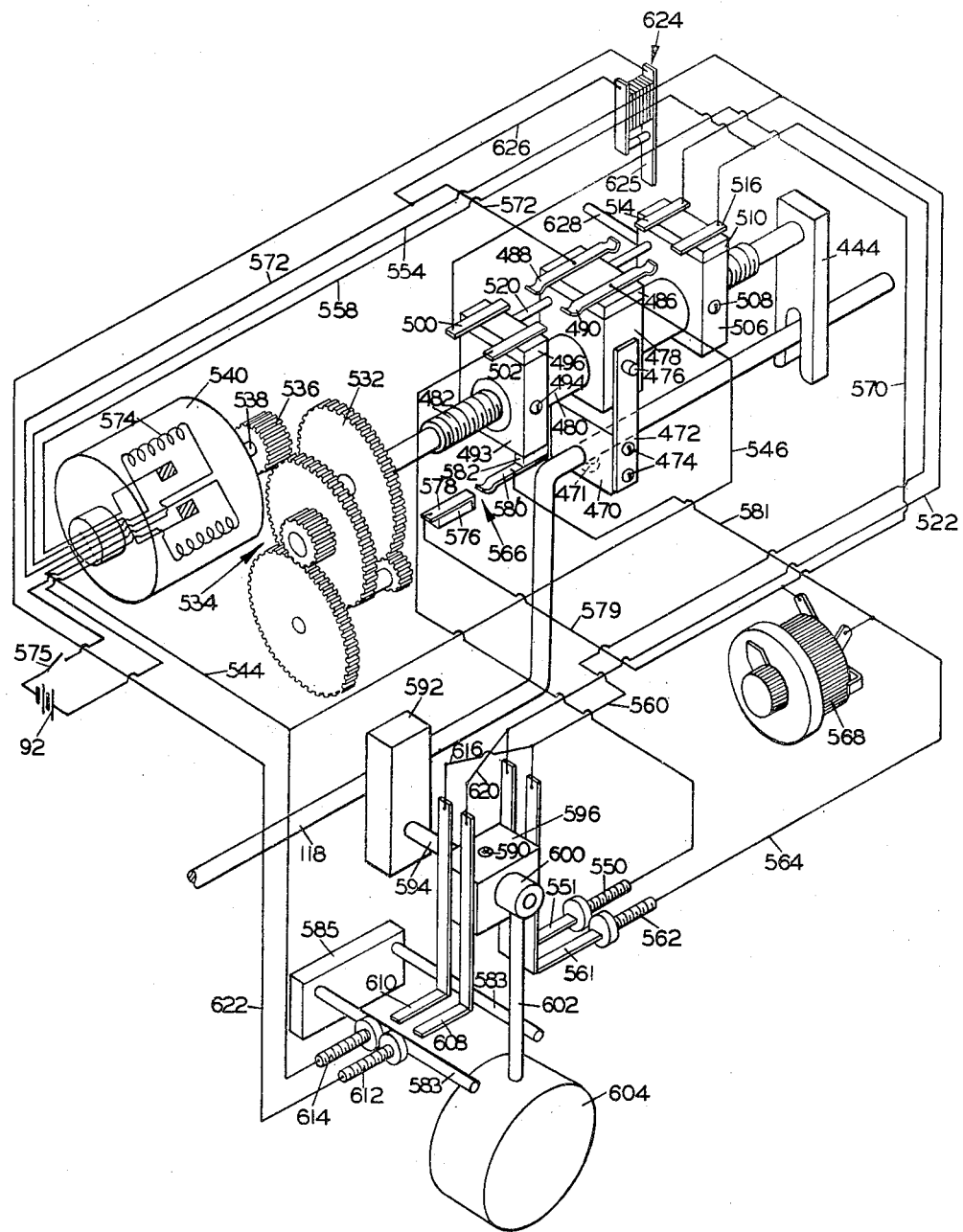
Fig. 3 is a detailed view showing the mechanical and electrical arrangement of the delayed action throttle assembly.

Reference is made to Fig. 2 where the arrangement of the throttle lever 82 and parts connecting the throttle with link 118 has been previously discussed. It will be recalled that an opening of throttle 82 causes sleeve 116 to move to the rear compressing spring 124. In the event that such a movement of throttle 82 takes place link 118, by virtue of the compression upon spring 124 will tend to move to the rear, but as is best seen in Fig. 3 block 470 is adjustably mounted upon link 118 by means of set screw 471. Two connecting strips 472 (only one shown) are provided, each of these members having its lower end attached to block 470 by means of screws 474. The upper end of each of these members is pivotally mounted upon stud 476 which is integral with block 478. This block is slidably mounted upon sleeve 480, the interior of which is threaded for coaction with screw 482. Fixedly mounted upon the top of block 478 by suitable means is an insulating block 486, and a pair of contacts 488 and 490 are affixed to insulating block 486.

Block 493 is adjustably affixed by means of screws 494 upon sleeve 480 for movement therewith and an insulating block 496 is rigidly affixed upon the top of this block. A pair of contacts 500 and 502 are in turn rigidly affixed upon the top of insulating block 496.

Block 506 is adjustably affixed upon the other end of sleeve 480 by means of screws 508 for movement with this sleeve, and insulating block 510 is rigidly affixed upon the top of the block. A pair of contacts 514 and 516 are rigidly affixed upon the top of insulating block 510. A guide 520 is adjustably mounted within blocks 493 and 506 and block 478 is free to slide along this guide. A bracket 444 is provided, this bracket being rigidly affixed to the frame (not shown) of the unit, the frame in turn being rigidly mounted within fuselage 10. The lower end of bracket 444 is in the form of a fork to guide the forward end of link 118, allowing that end of the link to move up and down because of the arcuate movement of the lower end of throttle lever 82, and also to prevent contact blocks 478, 493 and 506 as well as sleeve 480 from rotating with screw 482.

Rigidly affixed upon the rear end of the screw shaft 482 is gear 532. This gear is driven by the reduction gear train designated generally by 534, this train in turn being driven by gear 536 which is fixed upon the output shaft 538 of the reversible motor 540.

Referring now to Fig. 2, when throttle 82 is placed in the completely open position link 118 moves to the rear because of the compression of spring 124. However, as seen in Fig. 3, this movement to the rear of link 118 also moves block 470 in the same direction and by the action of connecting strip 472 block 478 also moves to the rear. However, the movement of link 118 to the rear is limited by the amount that block 478 may move before it is against block 493. Consequently, referring to Fig. 2, the movement which is imparted to bell crank 136 as a result of the complete opening of throttle 82 is also limited by the possible movement of block 478. Further, the opening of butterfly valve 152 is also limited by this same arrangement. Consequently, a complete opening of throttle 82 does not immediately result in a complete opening of butterfly valve 152 and engine 100 will not immediately run at its maximum speed, although some immediate increase in the speed of the engine results from the travel of block 478 until it engages block 493. This increase is sufficient to permit "taxiing" of the device through the water. The rate of movement of the device through the water therefore will be limited.

However, as soon as block 478 contacts block 493 it will be seen that contact 488 will engage contact 500 and at the same time contact 490 will come into engagement with contact 502. Referring to Fig. 4, as soon as contact 488 touches contact 500 and contact 490 comes into engagement with contact 502, which positions are shown in Fig. 4 in solid lines, current will flow from battery 92 through field winding 542 of motor 540 and then along conductors 544 and 546 to contacts 490 and 502. (Contacts 610 and 614 will be open as later shown.) From there the current flows along conductor 548 until it reaches contact points 550 and 551. The purpose of these contacts will be later described, it being deemed sufficient to state at this time that they are normally closed. Conductor 552 then carries the current to conductor 554 which connects with brushes and armature designated 556 of motor 540. (Contacts 608 and 612 as will also be shown later, are normally open.) Current therefore flows diagrammatically in Fig. 4 through the brushes and armature to the left and to conductor 558 to conductor 560. (Current cannot pass from contact 516 to contact 490 because these contacts are open.) Consequently, current flows along conductor 560 through contact points designated 561 and 562, which contact points are also normally closed. (Contacts 610 and 614 are also normally open, as later described.) Current continues its flow along conductor 564 and inasmuch as switch 566 is normally open it must flow through rheostat 568. From rheostat 568 conductor 570 leads the current to contacts 500 and 488 which are connected by means of conductor 572 with the other field winding 574 which in turn is connected to the other terminal of battery 92 through the switch 575 which is provided to individually control the unit.

Consequently, normally as soon as throttle 82 is completely opened current flows through field winding 542 to the right in Fig. 4, and to the left through the armature and brushes 556 as well as the field winding 574. Motor 540 will therefore turn in a given direction and by means of gear 536 and the reduction gear train 534 screw 482 will be turned clockwise as seen from the rear. Sleeve 480 will, as a result of the turning of screw 482, move toward the rear carrying with it block 493. As soon as block 493 moves to the rear the compression upon spring 124 shown in Fig. 2 will move link 118 to the rear and the movement of this link will pull block 478 to the rear, keeping contact 488 against contact 500 and contact 490 against contact 502. Consequently, motor 540 will continue to run until sleeve 480 and block 493 have moved sufficiently far to separate contacts 488 and 500 on the one hand and 490 and 502 on the other. This point will not be reached until the compression upon spring 124 is released when it reaches its neutralized position.

While motor 540 is energized, therefore, sleeve 480, block 493 and block 478 are moving to the rear, thus allowing link 118 to move in the same direction. The movement of link 118 to the rear moves the link 132 shown in Fig. 2 in the same direction and the upper end of bell crank 136 moves upwardly. Cable 140 is therefore pulled and butterfly valve 152 is opened against the action of spring 154. Consequently, if motor 540 continues to run butterfly valve 152 continues to open, the speed of engine 100 is thereby gradually increased until propeller 60 is rotating at the fastest rate possible for the existent throttle setting. In the event throttle 82 is opened sufficiently far the device will gradually increase its speed through the water until it is traveling at a sufficiently rapid rate to allow wings 18 and 20 and ailerons 22 and 24 to lift the pontoons 66 and 68 and part of the central column 12 out of the water.

By virtue of this arrangement, even though throttle lever 82 is placed in the completely open position the engine 100 gradually increases its full speed. The device therefore gradually increases its speed through the water just as a plane going down a runway gradually increases its speed. When the delayed movement of the device through the water is sufficiently great the pontoons and part of central column 12 leave the water in simulation of the leaving of the ground or water of a real plane under corresponding circumstances. As previously pointed out the student may cause, when the forward speed is sufficient, the pontoons to leave the water and the upper part of central column 12 to emerge by a pulling back of control stick 80.

It has been previously pointed out that as a real plane leaves the water or ground, depending upon whether it is a seaplane or a land plane, a rather sudden increase in lift is experienced and the plane moves forward at a markedly increased rate of speed. The following means are incorporated in this invention to simulate this phase of actual flight.

Referring to Fig. 3 block 576 is suitably fixed upon any part of the apparatus adjoining the shaft 482 and affixed to the top of this block is contact strip 578. A contact leaf 580 is affixed to insulating block 582 which in turn is affixed to the bottom of block 493. Contacts 578 and 580 comprise the switch designated generally in Figs. 3 and 4 by 566. When motor 540 has run sufficiently long to move block 493 to the rear so that contact 580 engages contact 578, it will be seen in Fig. 4 that after the current has passed through contacts 561 and 562, instead of passing through rheostat 568, conductor 570, contacts 500 and 488 to reach field winding 574, the current will follow the path of least resistance through conductor 581, contacts 580 and 578 and by means of conductor 579 to contacts 500 and 488 and then through conductor 572 to the field winding 574 and battery. Consequently, when contact is made between contacts 578 and 580 the voltage across motor 540 will be suddenly increased. Its rate of speed wil respond accordingly and the rotation of screw 482 will be much more rapid. Block 493 therefore moves to the rear at a more rapid rate and, consequently, block 478 will be urged in the same direction at a more rapid rate by virtue of the compression upon spring 124, which compression pulls link 118 to the rear. The movement of link 118 to the rear will therefore be accelerated and the rate of the opening of butterfly valve 152 will therefore be increased. Engine 100 will have its speed increased and the same is true of propeller 60. The resulting greater pulling force of propeller 60 will result in an increase in the acceleration of the speed of the device through the water and at the same time the lift will increase proportionately.

Contact 578 is positioned so that the accelerated speed of motor 540 occurs at about the same time as sufficient speed has been achieved to lift the pontoons and upper part of central column 12 out of the water.

It will therefore be understood that this invention discloses means for simulating in a device of the character disclosed the sudden increase in the forward speed and lift of the plane soon after it is in the air.

Rheostat 568 is adjustable in order that the speed of motor 540 and consequently the time required to achieve sufficient speed for the "take-off" may be controlled by the student or instructor up until the point is reached where the contacts 578 and 580 become closed.

Again, in the case of a plane in actual flight when the plane is flying with its throttle in a relatively advanced position, a sudden closing of the throttle does not result in a sudden extreme loss of substantially all forward speed and lift but rather the loss of forward speed and lift is somewhat gradual. The following means are incorporated in this invention in order that when the device is "flying" with the throttle in a relatively advanced position, a sudden closing of the throttle will not cause the device to suddenly lose substantially all its forward speed and lift as a result of the resistance of the water upon the forwardly moving submerged parts of the invention.

Reference is made to Fig. 2 wherein it will be seen that when throttle 82 is in a relatively advanced position the bottom end of throttle lever 82 is to the rear of pivot point 112. As previously explained, in the event the device has attained its maximum forward speed for the existent opened throttle position springs 124 and 126 are in their central positions. In the event throttle 82 is suddenly closed spring 126 will become compressed and by means of stop 122 will attempt to push link 118 toward the head of the device. However, referring to Fig. 3 the movement of throttle link 118 toward the head will cause block 478 to slide upon sleeve 480 and as soon as block 478 presses against block 506 link 118 cannot move farther forward. Inasmuch as the forward movement of link 118 is limited, reference to Fig. 2 will show that the closing of butterfly valve 152 is similarly limited and therefore engine 100 will only slow down to the extent that butterfly valve 152 is closed. Consequently, although some loss in the power output of engine 100 immediately occurs because of the initial travel of block 478 until it engages block 506, the engine is not immediately reduced to its idling speed. However, as soon as block 478 contacts block 506 it will be seen in Figs. 3 and 4 that contact 488 will press against contact 514 and contact 490 will come into engagement with contact 516.

Referring now to Fig. 4 the position of contacts 488 and 490 under the assumed conditions are shown by dotted lines. When contacts 488 and 490 come into engagement with contacts 514 and 516 respectively, current may flow from the lower terminal of battery 92 through field winding 542 of motor 540, along conductors 544 and 546 through contacts 490 and 516 along conductor 558 and to the right through the brushes and armature designated 556 of motor 540. From there the current flows through conductor 554 to contacts 514 and 488 along conductor 572 through field winding 574 and switch 575 to the other terminal of battery 92. Inasmuch as the current in this instance flows through the field windings 542 and 574 in the same direction as when the throttle is opened but through armature and brushes 556 to the right in Fig. 4 in the instant case while in the case when the throttle was opened it flowed through the armature and brushes to the left, it will be realized that the direction of the turning of the output shaft 538 of motor 540 will be reversed from the direction in which it turned when the throttle is opened. Consequently, referring to Fig. 3, screw 482 will turn counterclockwise as seen from the rear of the device and sleeve 480 carrying with it blocks 493 and 506 will move toward the head of the trainer. The movement of block 506 toward the front allows the compressed spring 126 to force link 118 and, consequently, blocks 470 and 478 in the same direction keeping block 478 in contact with block 506. Consequently, contact is continuously made between contacts 490 and 516 on the one hand and 488 and 514 on the other. Motor 540 continues to run therefore moving sleeve 480 and block 506 forward until contact 488 becomes separated from contact 514 and contact 490 becomes separated from contact 516. This separation occurs soon after the spring 126 comes to its neutral position. During the time in which motor 540 is operating a reference to Fig. 2 will show the accompanying forward movement of link 118 will result in a movement of link 132 in the same direction. The upper end of bell crank 136 will be moving downwardly, releasing the cable 140. Consequently, spring 154 will, during the same time interval, gradually be closing butterfly valve 152. Engine 100 will therefore have its speed gradually reduced. The propeller 60 of course has a speed proportional to that of engine 100. The driving force of the propeller through the water is gradually decreased and, consequently, the forward speed of the apparatus of the invention gradually drops off. With the dropping off of forward speed the lift produced by wings 18 and 20 and ailerons 22 and 24 diminishes and in addition to having a reduced forward speed the device gradually settles until pontoons 66 and 68 are partially submerged.

In view of the preceding disclosure, this invention provides means whereby the gradual loss of forward speed and lift of a plane in actual flight as a result of the closing of a throttle in the plane may be simulated in the device of this invention, in spite of the normally sudden decrease of forward movement of a submerged body when the motivating power is cut off.

Means for simulating the gradual increase in the speed of a plane during the takeoff and for simulating the sudden increase and lift in forward speed of the plane soon after its leaving the ground or water have been previously pointed out.

*Means for simulating mushing and stalling of a plane*

Assuming that a plane is flying at about cruising conditions and the pilot pulls back on the control stick to slightly raise the nose of the plane, the resultant increase in the angle of attack of the wings causes a reduction in air speed and the plane will gain altitude slowly. A further pulling back upon the control stick and resultant increase in the angle of attack of the wings will cause the speed and lift of the plane to decrease and it flies along "nose high" but slowly losing altitude. This situation is commonly referred to as "mushing." Again, if the angle of attack is still further increased the further loss of speed and lift will cause the plane to lose altitude rapidly. This is generally called "stalling."

The following means are incorporated in the apparatus of this invention to simulate the "mushing" and "stalling" of a plane in actual flight.

Referring to Fig. 3, there is disclosed a block 592 which is suitably rigidly affixed to the frame of the unit there shown. Fixedly mounted withing block 592 is a horizontal shaft 594 which runs transversely of fuselage 10 and block 596 is adjustably mounted by means of set screw 590 upon a rotatable sleeve (not shown) which is mounted on shaft 594. Hub 600 is integral with arm 602 which has attached at its lower end pendulum 604, hub 600 being adjustably affixed to block 596. Fixedly attached to the rear end of block 596 are the contact brackets 608 and 610 and similarly affixed to the front end of block 596 are the contact brackets 551 and 561. These brackets are suitably insulated from block 596. A pair of adjustable pendulum stops 583 mounted in a bracket 585 are provided. Screw contact 550 is connected through conductor 548, contacts 502 and 490 and conductors 546 and 544 to the field winding 542 of motor 540. Screw contact 562 is connected by means of conductor 564, rheostat 568, conductor 579, contacts 500 and 488, and conductor 572 with the field winding 574 of motor 540. In the event rheostat 568 is shunted by closing switch 566, screw contact 562 is connected with the field winding 574 by means of conductors 564 and 581, switch 566, conductor 579, contacts 500 and 488 and conductor 572.

It will be recalled that for motor 540 to run when the throttle 82 is opened, current must flow through the contacts 551 and 561 and the screws 550 and 562 respectively. Screws 550 and 562 are held by a suitable fixed part of the unit, and these screws as well as pendulum 604 may be adjusted so that when the device is in level "flight" or climbing at a relatively slight angle contact 551 engages screw 550 and contact 561 engages screw 562. Assuming that the throttle 82 has been opened and the motor 540 is running in order to further open butterfly valve 152 to increase the speed of the device through the water, or the butterfly valve is already completely opened, a slight pulling back by the student of control stick 80 will not, therefore, cause the screws 550 and 562 to move away from the contacts 551 and 561 and, therefore, motor 540 continues to run to open the butterfly valve to increase the speed of the propeller. However, in the event the student pulls back on the control stick 80 to raise the nose of the fuselage 10 to the point where an airplane would "mush," screws 550 and 562 will, as a result of the raising of the nose of the fuselage, move out of contact with contacts 551 and 561 which are not affected by the nosing up of the fuselage because of pendulum 604, and motor 540 will stop. Butterfly valve 152 will not be further opened and the engine will continue to run at the same rate that it was running immediately prior to the increased elevation of the front of fuselage 10. The increased drag of the wings 18 and 20, ailerons 22 and 24, chambers 14 and 16 and the loss of efficiency of prop 60 because of their angular movement through the water will cause a dropping off of the forward speed of the device as well as a slight settling. This response of the apparatus therefore simulates the situation in actual flight where the nose of the plane is raised to the point that "mushing" occurs.

If then the operator in fuselage 10 pulls farther back upon control stick 80 the nose of fuselage 10 will be even further raised, and screws 612 and 614 which are suitably carried by a fixed part of the device will move with the fuselage and come in contact with the contacts 608 and 610 respectively, these last two contacts not being affected by the raising of the nose of the fuselage because of pendulum 604. Referring to Figs. 3 and 4, it will be seen that at the instant this happens current instead of flowing from conductor 544 to conductor 546 will flow down conductor 544 to screw 614 to contact 610 and up conductor 616 to conductor 560. (Current cannot flow down through contact 561 and screw 562 because the circuit is broken at this point and current cannot flow from contact 516 to contact 490 because these contacts are open.) Consequently, it flows along conductor 558 through the armature and brushes 556 of motor 540 to the right in Fig. 4. The current then flows along conductor 554 and inasmuch as contacts 514 and 488 are open it goes along conductor 552 and conductor 620 to contact 608 and screw 612. (Contacts 561 and 562 are open.) From screw 612 the current flows through conductor 622 and inasmuch as switch 624 is normally closed, as later shown, it will continue along conductor 626 to conductor 572 and through the field winding 574 and switch 575 to the other side of battery 92. It will be noticed therefore that as soon as contact is made between members 608 and 612 on the one hand and members 610 and 614 on the other, current flows through the armature and brushes 556 of motor 540 in the direction which causes the motor 540 to rotate screw shaft 482 counterclockwise as seen from the rear. This is in spite of the fact that in the normal position when the throttle is opened motor 540 runs to turn shaft 482 in the opposite direction. As has been previously explained, the rotation of shaft 482 in a counterclockwise direction as seen from the rear moves sleeve 480 toward the head of the trainer. Through the previously described means, therefore, butterfly valve 152 will be closed and, consequently, engine 100 and propeller 60 will have their speeds progressively reduced. The forward speed of the device through the water is therefore decreased, and consequently, the lift of the device is affected in the same way, causing the device to rapidly slow down and settle. This slowing down and settling of the device simulates the "stalling" of a plane in actual flight.

Referring now to Figs. 3 and 4, there is provided the limit switch designated generally by 624. This limit switch which is normally closed has an arm 625 which is engaged by stud 628 which is rigidly affixed to block 506 when sleeve 480 and block 506 are moved by motor 540 to the point where block 506 reaches the fore end of screw 482. When stud 628 opens switch 624, it will be seen in Fig. 4, current will not flow as is normally the case when contacts 608 and 612 make, and, therefore, motor 540 will stop. This switch is provided in order that when the motor 540 is energized to close the butterfly valve 152, because of the climbing attitude of the fuselage, overtravel of the sleeve 480 will be prevented.

When the device is flying in level flight the sleeve 480 cannot overtravel because the spring 124 will have its compression resulting from an opening of the throttle released before the point of overtravel is reached, and motor 540 stops.

From the preceding description it will be understood that this invention provides delaying means whereby upon a complete advancing of the throttle lever the acceleration of engine speed and consequent movement of the apparatus through the water is gradually increased until sufficient speed is realized to produce the lift required to raise the pontoons out of the water and to cause all of the other parts of the device to move upwardly. When this point is reached means are also provided for increasing the speed of the engine at a much more rapid rate to produce a greater increase in forward speed and lift.

Also, if the device is "flying" with the throttle in a relatively advanced position a complete retarding of the throttle lever does not result in a corresponding immediate decrease in the speed of the engine, but instead means are provided for gradually causing the engine to slow down.

Further, if the device is "flying" with the pontoons out of the water and the other parts of the apparatus raised accordingly a slight increase in the climbing attitude of the device will not affect the engine speed and, consequently, the engine will respond exactly the same as when the device is in level flight. However, when the climbing attitude of the fuselage is increased to a given point, means are provided whereby the engine speed may not further increase in the event it has not yet reached the maximum speed for the existent throttle setting. Then if the climbing attitude of the fuselage be further increased means are provided for reducing the speed of the engine. In the event the butterfly valve is closed in response to this last-mentioned condition, means are provided for preventing overtravel of the controlling unit.

*Other associated features*

Referring to Figs. 1 and 6, there is rigidly affixed to the rear vertical edge 27 of chamber 16 a bearing housing 630. Rotatably mounted within this housing is a shaft 632 upon the rear end of which is propeller 634. Shaft 632 enters a suitably supported housing 730 seen in Fig. 6 and shown in detail in Figs. 14 and 15. It will be seen that shaft 632 is fixed in the rear end of block 732 and also fixed in block 732 ahead of shaft 632 is rod 734. A pair of centrifugally responsive members 736 connected by springs 738 are provided, and in each of the members 736 is a bore 740 for receiving rod 734. It will be understood that when the device shown in Fig. 1 is moving through the water at a sufficiently rapid rate, propeller 634 will turn fast enough to cause the centrifugally responsive members 736 to slide outwardly along rod 734 against the tension of springs 738, and members 736 will grip the inner surface of clutch member 730 and rotate the same. Shaft 742 is fixed to member 730 to rotate therewith, and the other end of this shaft is connected to the simulated air speed indicator 638 shown in Fig. 2. This indicator is mounted on the instrument panel 78 seen in Fig. 1 and may comprise an arrangement similar to the ordinary tachometer, the dial 640 across which the needle 642 moves being graduated in miles per hour. The faster the device is moving through the water the faster propeller 634 turns and, consequently, a greater simulated air speed will be indicated. The arrangement comprises ratios such that the indicated air speed is much higher than the actual speed of the device through the water.

The previously described clutching arrangement is provided so that below a given point the simulated air speed indicator does not register. This simulates generally the action of the air speed indicator in most modern planes where the lower end of the scale is so condensed that it is not usable.

Reference is now made to Fig. 6 which is a cross sectional view of the lower part of the apparatus. The central column 12 and chambers 14 and 16 are shown. It will be seen that engine 100 is held by brackets 644 which in turn are suitably affixed to the bottom 646 of chamber 16. Battery 92 is rigidly held within chamber 16 as shown, ahead of engine 100. A suction chamber 648 is connected by means of suitable tubing 650 with a rotary gear pump 652 which in turn is connected with engine 100 by means of tube 654. Pump 652 is driven by shaft 656 which is driven by generator 658. The generator in turn is suitably driven by the crank shaft 104 of engine 100. A plurality of small holes 660 are present in the bottom 646 of chamber 16 and by virtue of these holes pump 652 can force fresh water into engine 100 to cool the same. The water having circulated throughout the engine leaves it by means of the pipe 662 which empties into tube 664 which, as shown, goes up inside central column 12 and is suitably turned at the top thereof to emit the hot water. A gas exhaust pipe 666 is provided and extends within pipe 664 as shown to emit the exhaust gases from engine 100.

Figure 6A:
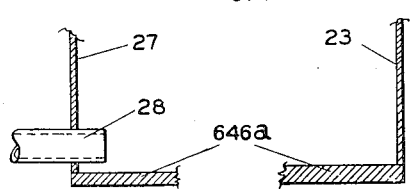
Fig. 6A shows an alternate form of the main chamber.

Several hundred pounds of lead in various sections 673 are placed in the bottom of chamber 16 and in longeron 28 to lower the center of gravity of the device as well as to properly balance the same. Fig. 6A shows that instead of employing lead to weight the chamber, the same result may be achieved by making the bottom 646a thicker. Of course, the same result may be achieved by making the side walls of the chamber thicker than is necessary to merely house the apparatus therein.

Also seen in Fig. 6, within chamber 16 toward the rear end thereof is an electric motor 668 which may be energized by the upward movement of float 670 acting upon switch 672. A pump is contained within member 674 and is driven by motor 668 so that whenever sufficient water is present within the bottom of chamber 16 the pump forces the water out through pipe 676.

It will be seen that vertical bulk head 268 forms a watertight seal with horizontal member 680 to keep all of central column 12 and chamber 14 except the chamber 682 formed by members 268 and 680 completely free of water. Chamber 16 is completely free of water except insofar as water may leak into the device. Chamber 682 is, however, normally completely filled with water by virtue of the passage of the same thereinto around links 42 and 44. Stuffing boxes 202, 246 and 356 provide watertight fittings yet allow their associated interiorly held shafts to pass into the water filled chamber 682. Wings 18 and 20 as well as ailerons 22 and 24 are normally completely filled with water, as are rudder 34, elevator 46 and horizontal stabilizer 52. Allowing these parts to fill with water further lowers the center of gravity of the device thereby increasing its stability, yet it does not interfere with their coaction with the water to produce the desired control as previously outlined.

Referring to Fig. 1, it will be seen that within fuselage 10 behind the seat 76 there is provided a gasoline tank 684 which is connected by means of line 686 with the carburetor 157. Conventional fuel and oil pressure gauges, a tachometer, etc., may be provided.

A plurality of plates 688 form a portion of the sides of chamber 16, these plates being removably attached thereto by means of screws 690 to permit access to the mechanism within this chamber. These plates may be sealed in a watertight fashion by the use of a suitable sealing compound and/or gaskets.

Figures 7, 14, 15:
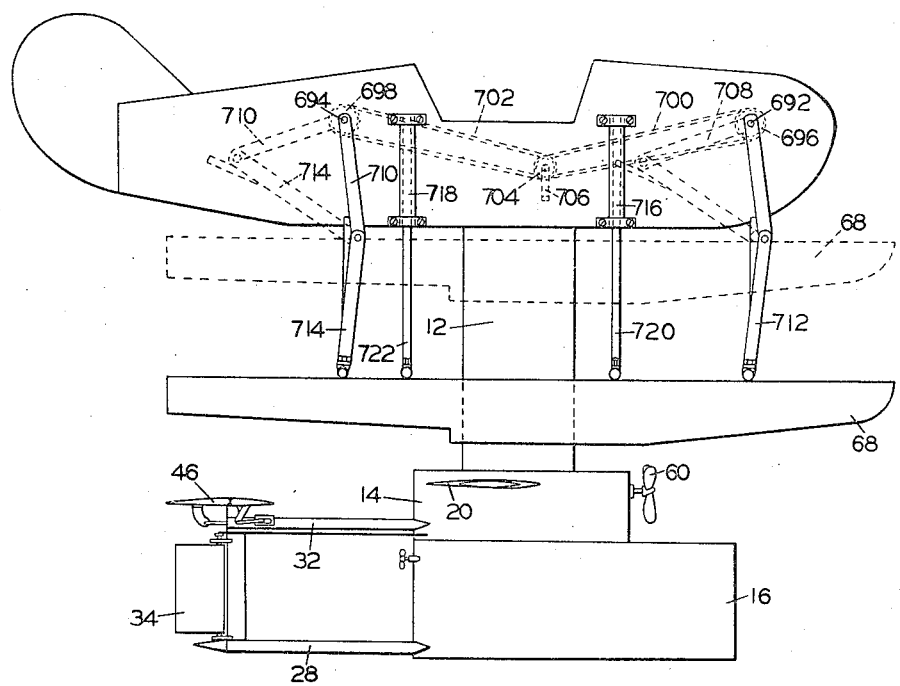
Fig. 7 shows an alternative pontoon arrangement which may be used with the device.
Figs. 14 and 15 are detailed views of a part of the air speed indicating system.
Figure 8:
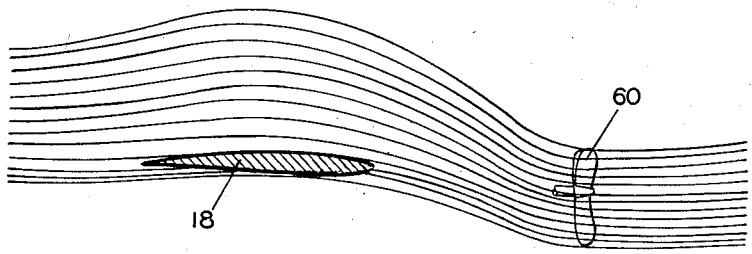
Fig. 8 shows the relative positions of the propeller and wings to give maximum lift.

Reference is made to Fig. 7 which discloses a retractable pontoon arrangement which may be used with this invention. As seen, two transverse horizontal shafts 692 and 694 are provided, one of these shafts extending through fuselage 10 ahead of the cockpit opening and the other extending through the fuselage behind the cockpit opening. A pair of sprocket gears 696 and 698 are provided, each of these gears being rigidly mounted upon its associated shaft 692 and 694 respectively. A pair of chains 700 and 702 are driven by a sprocket gear 704 affixed to crank 706. Arm 708 is rigidly mounted upon shaft 692 and arm 710 is likewise affixed upon shaft 694. Pivotally attached to the lower end of each of these last two arms are the arms 712 and 714, the lower ends of which are pivotally connected to the right pontoon 68. Suitably affixed upon the side of fuselage 10 are a pair of guide sleeves 716 and 718 and a pair of vertical rods 720 and 722 are rigidly affixed to pontoon 68.

In Fig. 7, pontoon 68 is shown at its lowermost position and it will be noticed that the arms 708 and 712 on the one hand and 710 and 714 on the other form a slight angle when arms 708 and 710 are in their most counterclockwise positions. A positive stop of conventional type may be provided in order that an upward force exerted against pontoon 68 will not allow collapsing of the arms when they are positioned as shown.

Members corresponding to the arms 708, 712, 710 and 714 and to the guiding means 716, 720, 718 and 722 are provided upon the other side of the device to regulate the position of the left pontoon which is not shown in Fig. 7.

It will be understood that when the pontoons are in the position shown in Fig. 7 crank 706 may be rotated by the student in the fuselage 10 and by means of chains 700 and 702 gears 696 and 698 will be rotated so that the arms 708 and 710 move clockwise into the positions shown by the dotted lines in Fig. 7. Consequently, arms 712 and 714 will be moved into the positions shown in dotted lines and the pontoon 68 will move upwardly to the position shown in dotted lines. Guides 720 and 722 coacting with sleeves 716 and 718 assure a direct vertical movement of the pontoons and prevent a swinging thereof when the device is in "flight."

It will be understood that when the device is provided with retractable pontoons the pontoons may be lowered by means of crank 706 to a position just above the propeller 60. The depth of the water then necessary to keep the bottom 646 of chamber 16 from touching the bottom of the water course is not as great as though the pontoons were in the fixed position shown in Fig. 1. It is therefore possible to put the device into shallower water, prior to operation, than if the retractable pontoons were not provided, and then taxi out into deeper water to "fly" the device. Then, when the student has "taken off," he may by means of crank 706 raise the pontoons as described in simulation of the raising of the undercarriage of certain types of aircraft after the take-off. The maneuverability of the device is increased after the pontoons have been retracted.

*Summary*

The foregoing disclosure describes an aquatic device having a propeller, wings, ailerons, an elevator, rudder and horizontal stabilizer as well as two chambers all normally submerged in the water for coaction therewith, these elements being connected to a fuselage positioned above the water by means of a central hollow supporting column. The engine, many of the other heavy parts and extra added weight are placed in the lowermost chamber to produce a low center of gravity, thereby increasing the stability of the device. Within the fuselage is provided controls simulating the ordinary controls used by a real airplane and by a manipulation of these controls the occupant of the fuselage may cause the device to bank, climb, dive and turn in the same manner that a real pilot would cause a real plane to perform the corresponding movements. In addition, means are also provided for causing the device to turn when banked and the inherent construction of the apparatus produces automatic bank with turn. Consequently, the device simulates the responses of an airplane in these two respects. The operator may use the provided horizontal stabilizing means to "trim" the device just as the pilot of a real plane would use the corresponding means in a real plane. Furthermore, means are provided whereby the responses of a real plane to an opening and closing of the throttle in the plane may be simulated by the responses of the subject matter of this invention. In addition, means are provided whereby the device will simulate the mushing and stalling of a plane in actual flight. Numerous instruments may be provided, these instruments simulating the functioning of the instruments in a plane in actual flight.

While a preferred embodiment only of this invention has been disclosed, numerous changes in the construction and arrangements thereof may be made without departing from the substance of the invention.

I claim:

1. In an aquatic device of the character described the combination of a cockpit having a seat for an operator, a depending member for supporting said cockpit, a marine propeller held by said depending member a substantial distance below said cockpit, a throttle lever positioned to be operated by an operator in said seat, and time delay means operatively interconnecting said throttle lever and said propeller for decreasing the normal rate of increase in the speed of said propeller in response to a movement of said throttle lever in a given direction and for decreasing the normal rate of decrease in the speed of said propeller in response to a movement of said throttle lever in the opposite direction.

2. In an aquatic device of the character described the combination of a cockpit having a seat for an operator, a depending member for supporting said cockpit, a marine propeller held by said depending member a substantial distance below said cockpit, a throttle lever positioned to be operable by an operator in said seat, means interconnecting said lever and propeller for normally increasing the speed of said propeller by a movement of said throttle lever in a given direction, and means forming a part of said interconnecting means responsive to the climbing angle of said cockpit for rendering said throttle lever ineffective for increasing the speed of said propeller whenever said cockpit assumes a predetermined climbing angle.

3. In an aquatic device of the character described the combination of a cockpit having a seat for an operator, a depending member for supporting said cockpit, a marine propeller held by said depending member a substantial distance below said cockpit, a throttle lever positioned to be operable by an operator in said seat, means interconnecting said lever and propeller for normally increasing the speed of said propeller by a movement of said throttle lever in a given direction, and means forming a part of said interconnecting means responsive to the climbing angle of said cockpit for decreasing the speed of said propeller irrespective of the movements of said throttle lever when said cockpit assumes a predetermined climbing angle.

4. In an aquatic device of the character described the combination of a cockpit having a seat for an operator, a supporting member attached to and depending from said cockpit, a plurality of control surfaces associated with the lower end of said supporting member, a plurality of manually operable controls connected to said control surfaces, said controls being positioned to be operable by an operator in said seat, an engine, a marine propeller connected to said engine to be driven thereby, a throttle lever positioned to be operated by an operator in said seat, means interconnecting said lever and engine for normally increasing the speed of said engine in response to an opening of said throttle, and means forming a part of said interconnecting means for rendering said throttle lever ineffective for increasing the speed of said engine whenever said cockpit assumes a predetermined climbing angle.

5. In an aquatic device of the character described the combination of a cockpit having a seat for an operator, a supporting member attached to and depending from said cockpit, a plurality of control surfaces associated with the lower end of said supporting member, a plurality of manually operable controls connected to said control surfaces, said controls being positioned to be operable by an operator in said seat, an engine, a marine propeller connected to said engine to be driven thereby, a throttle lever positioned to be operated by an operator in said seat, means interconnecting said lever and engine for normally increasing the speed of said engine in response to an opening of said throttle, and means forming a part of said interconnecting means for decreasing the speed of said engine irrespective of the position of said throttle lever whenever said cockpit assumes a predetermined climbing angle.

FRANKLIN A. FISH.

REFERENCES CITED

The following references are of record in the file of this patent:

UNITED STATES PATENTS

| Number | Name | Date |
|---|---|---|
| 1,019,566 | Walker | Mar. 5, 1912 |
| 1,272,766 | Bongartz | July 16, 1918 |
| 1,630,623 | Ludasy | May 31, 1927 |
| 1,823,735 | Glasby | Sept. 15, 1931 |
| 1,825,363 | Robertson | Sept. 29, 1931 |
| 1,846,602 | Lake | Feb. 23, 1932 |
| 1,865,828 | Buckley | July 5, 1932 |
| 1,927,938 | Huffman | Sept. 26, 1933 |
| 2,099,857 | Link | Nov. 23, 1937 |
| 2,201,896 | Granat | May 21, 1940 |
| 2,358,016 | Link | Sept. 12, 1944 |
| 2,358,018 | Lowkrantz | Sept. 12, 1944 |